United States Patent
Kouda et al.

(10) Patent No.: US 8,761,950 B2
(45) Date of Patent: Jun. 24, 2014

(54) POWER CONTROL SYSTEM AND METHOD AND PROGRAM FOR CONTROLLING POWER CONTROL SYSTEM

(75) Inventors: Tetsuya Kouda, Osaka (JP); Kazunori Kurimoto, Hyogo (JP); Satoshi Tsujimura, Shiga (JP); Naofumi Nakatani, Shiga (JP); Yasuo Yoshimura, Shiga (JP)

(73) Assignee: Panasonic Corporation, Osaka (JP)

( * ) Notice: Subject to any disclaimer, the term of this patent is extended or adjusted under 35 U.S.C. 154(b) by 426 days.

(21) Appl. No.: 13/143,439

(22) PCT Filed: Jan. 6, 2010

(86) PCT No.: PCT/JP2010/000046
§ 371 (c)(1),
(2), (4) Date: Jul. 6, 2011

(87) PCT Pub. No.: WO2010/079747
PCT Pub. Date: Jul. 15, 2010

(65) Prior Publication Data
US 2011/0270456 A1 Nov. 3, 2011

(30) Foreign Application Priority Data

Jan. 6, 2009 (JP) ............... P2009-000508
Jan. 7, 2009 (JP) ............... P2009-001292

(51) Int. Cl.
| | | |
|---|---|---|
| G01R 21/06 | (2006.01) |
| G05B 11/01 | (2006.01) |
| G05D 9/00 | (2006.01) |
| H05B 3/00 | (2006.01) |
| H05B 3/02 | (2006.01) |
| H05B 6/02 | (2006.01) |
| H02J 13/00 | (2006.01) |
| H02J 3/14 | (2006.01) |

(52) U.S. Cl.
CPC *H02J 3/14* (2013.01); *Y04S 20/242* (2013.01); *Y04S 20/222* (2013.01); *Y02B 90/2653* (2013.01); *Y04S 40/126* (2013.01); *Y02B 70/3225* (2013.01); *H02J 13/0075* (2013.01); *Y02B 70/3266* (2013.01); *H02J 2003/143* (2013.01)
USPC ......... 700/292; 700/11; 700/22; 700/286; 700/295; 219/200; 219/482; 219/483; 219/485; 219/486; 219/600; 702/60

(58) Field of Classification Search
USPC ......... 700/11, 22, 286, 292, 295; 219/200, 219/482, 483, 485, 486, 600; 702/60
See application file for complete search history.

(56) References Cited

U.S. PATENT DOCUMENTS 5,572,438 A * 11/1996 Ehlers et al. ........... 700/295
6,018,690 A    1/2000 Saito et al.
(Continued)

FOREIGN PATENT DOCUMENTS

| | | |
|---|---|---|
| CN | 1371541 A | 9/2002 |
| JP | 10-094170 A | 4/1998 |

(Continued)

OTHER PUBLICATIONS

Office Action in corresponding Chinese Application No. 201080010839.3, and English language translation thereof, dated Jun. 25, 2013, 27 pp.. Priority Information:.

(Continued)

*Primary Examiner* — Mohammad Ali
*Assistant Examiner* — Jennifer L Norton
(74) *Attorney, Agent, or Firm* — Brinks Gilson & Lione

(57) ABSTRACT

A power control device includes a priority setting section capable of setting a use priority of a home appliance connected wirelessly or via cable or an adapter connected to the home appliance. The home appliance or the adaptor connected to the home appliance operates within the usable power of a result of the inquiry to the power control device. When there is no excess in usable power over the required power in the inquiry, the power control device reduces the power of a device having a lower priority than the device which has transmitted the inquiry in order to use the device with the higher priority.

6 Claims, 15 Drawing Sheets

(56) References Cited

U.S. PATENT DOCUMENTS

| | | | |
|---|---|---|---|
| 6,157,008 A * | 12/2000 | Brown et al. | 219/486 |
| 6,301,674 B1 * | 10/2001 | Saito et al. | 713/340 |
| 6,868,293 B1 * | 3/2005 | Schurr et al. | 700/22 |
| 7,561,977 B2 * | 7/2009 | Horst et al. | 702/62 |
| 7,738,999 B2 * | 6/2010 | Petite | 700/295 |
| 8,190,302 B2 * | 5/2012 | Burt et al. | 700/295 |
| 8,229,602 B2 * | 7/2012 | Montgomery et al. | 700/295 |
| 8,374,729 B2 * | 2/2013 | Chapel et al. | 700/295 |
| 8,541,719 B2 * | 9/2013 | Steurer | 219/493 |
| 2004/0254654 A1 * | 12/2004 | Donnelly et al. | 700/22 |
| 2011/0172841 A1 * | 7/2011 | Forbes, Jr. | 700/292 |
| 2013/0178994 A1 * | 7/2013 | Valluri et al. | 700/292 |

FOREIGN PATENT DOCUMENTS

| | | |
|---|---|---|
| JP | 10-094199 A | 4/1998 |
| JP | 2003-209924 A | 7/2003 |
| JP | 2007-215313 A | 8/2007 |
| JP | 2008-089431 A | 4/2008 |
| JP | 2008-099343 A | 4/2008 |
| JP | 2008-271721 A | 11/2008 |
| WO | WO 01/01542 A1 | 1/2001 |
| WO | WO 02/13351 A1 | 2/2002 |

OTHER PUBLICATIONS

International Search Report for International Application No. PCT/JP2010/000046, dated Mar. 30, 2010, 2 pages.

* cited by examiner

*FIG. 6*

| | LEFT IH, RIGHT IH | REAR IH | GRILL |
|---|---|---|---|
| MANUAL SETTING | LEVEL1 300W<br>LEVEL2 400W<br>LEVEL3 500W<br>LEVEL4 700W<br>LEVEL5 900W<br>LEVEL6 1100W<br>LEVEL7 1600W<br>LEVEL8 2100W<br>LEVEL9 2500W<br>LEVEL10 3000W | LEVEL1 300W<br>LEVEL2 400W<br>LEVEL3 500W<br>LEVEL4 700W<br>LEVEL5 900W | GRILL ON 1900W |
| AUTOMATIC COOKING | PREHEATING 3000W<br>FRIED PREHEATING 2500W<br>FRIED 2000W<br>BOILING 3000W<br>COOKING 1000W | | AUTOMATIC COOKING 1900W |

FIG. 7

| PRIORITY | DEVICE | POWER CONSUMPTION STATE | POWER REDUCTION CONTROL STATE |
|---|---|---|---|
| 1 (HIGH) | IHCH | 2100W | OFF |
| 2 (MIDDLE) | AIR CONDITIONER 1 | 600W | OFF |
| 3 (LOW) | AIR CONDITIONER 2 | 500W | OFF |

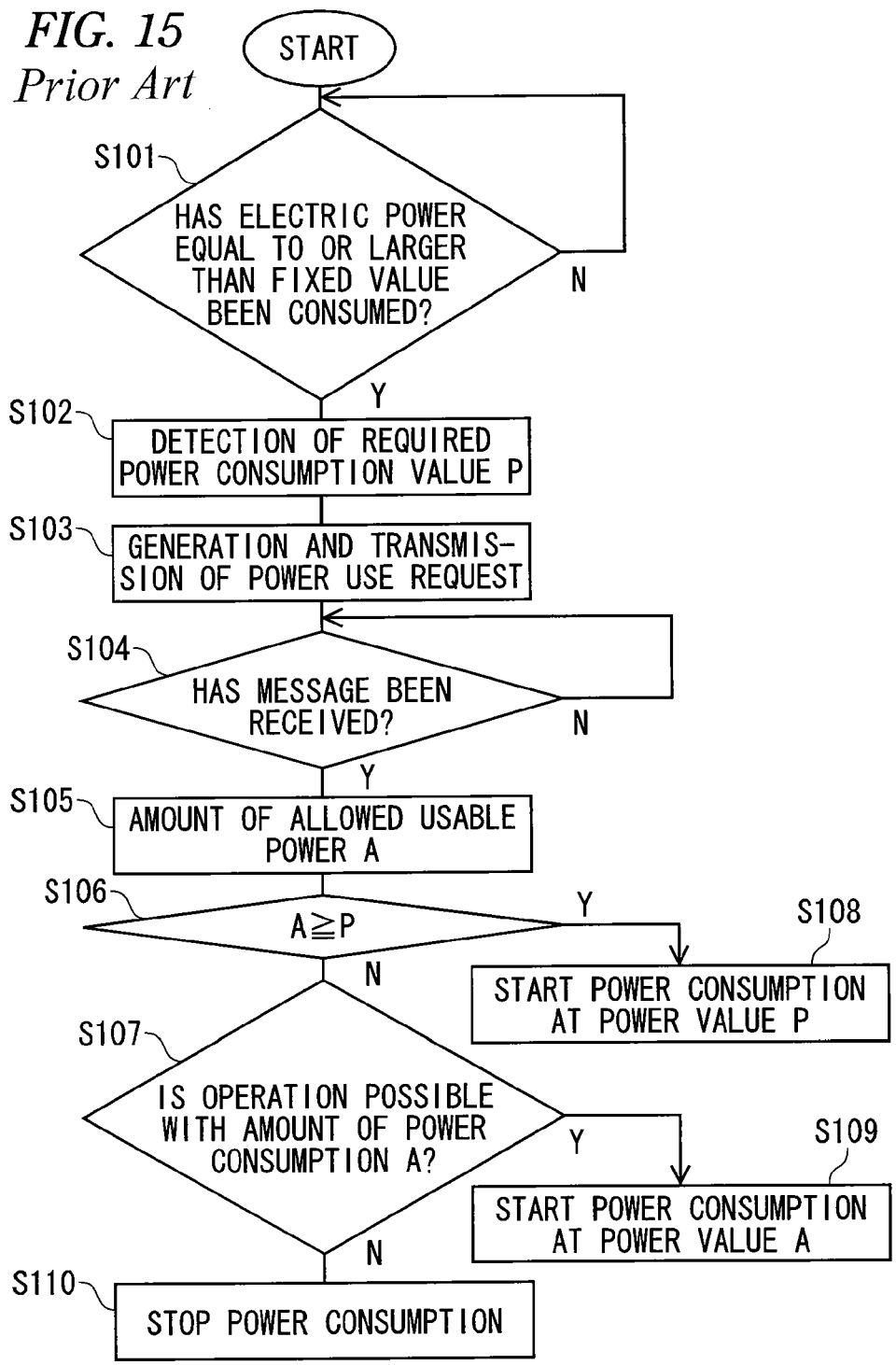

POWER CONTROL SYSTEM AND METHOD AND PROGRAM FOR CONTROLLING POWER CONTROL SYSTEM

This application is a 371 application of PCT/JP2010/000046 having an international filing date of Jan. 6, 2010, which claims priority to JP2009-000508 filed Jan. 6, 2009 and JP2009-001292 filed Jan. 7, 2009, the entire contents of which are incorporated herein by reference.

TECHNICAL FIELD

The present invention relates to a power control system configured to control a device in order to prevent a current limiter in a main domestic power line from operating due to an overcurrent to thereby cut off electric power of the device being used, and a method and a program for controlling a power control system.

BACKGROUND ART

In an example of this kind of power control system, a device requests a breaker device for use permission in use, the breaker device determines whether to permit the use, and the device operates within electric power permitted by the breaker device (for example, see Patent Document 1).

FIG. 14 is a configuration diagram of a related-art power control system disclosed in Patent Document 1, and FIG. 15 is a flow chart showing the processing operation of a device.

In FIG. 14, a power line network includes a breaker device 101, a power line 102, outlets 103A to 103D, devices 104 to 106, and a power supply line 107.

In the above configuration, in the operation shown in FIG. 15, it is assumed that control units of the devices 104 to 106 have detected a trigger caused by power consumption of a certain value or more (S101). For example, this is a phenomenon, such as turning-on of a power supply or an increase in a set temperature in the case of an iron, turning-on of a power supply or a change in a set temperature in the case of an air conditioner, or turning-on of a power supply or the start of discharge of an internal microwave in the case of a microwave oven. The control unit detects the value of power consumption (referred to as P) necessary for this (S102).

Then, a power use request message is generated. The power use request message includes a control code indicating that this is a power use request message, and the value of P as the amount of requested power (S103).

Then, at the device side, the devices 104 to 106 which have received a use permission message containing the amount of allowed usable power A determine whether it is reasonable to operate themselves with reference to the values of the amount of allowed usable power indicated in the use permission message (S104 to S107). If this value of electric power is a requested value, the consumption of electric power is started with this power consumption (P) without any problem (S108). Even if the allowed power consumption (A) is smaller than the requested value (P), the consumption of electric power is started with the power consumption (A) if it is determined that power consumption of this value is reasonable (S109). If it is determined that the power consumption of this value is not reasonable, performing the consumption of electric power is stopped (S110).

In this way, in the power supply network, it is possible to control the amount of supplied power of a fixed amount or less and to efficiently distribute electric power.

Patent Document 1: JP-A-10-94199

SUMMARY OF THE INVENTION

Problem to be Solved by the Invention

However, in the related-art power control system, when a device receives a use non-permission message, the device inquires about the use is sent again. As a result, two rounds of transmission and reception are required. Moreover, in the case of use non-permission, it is not possible to use a device which a user wants to use unless usable power is increased when the electric power monitored by the breaker device decreases or when the user intentionally performs an operation of reducing electric power of other devices in use. In addition, there has been a disadvantage in that even for a device which a user wants to use, that is, a device with a high priority, if permission to use the device is not given, the device cannot be used.

An object of the present invention is to provide a power control system and a method and a program for controlling the power control system. The power control system includes a power control device including a priority setting section capable of setting the use priority of a home appliance connected wirelessly or via cable or an adapter connected to the home appliance. In accordance with a result of an inquiry about usable or required power, the home appliance or the adapter connected to the home appliance is operated within the usable power based on the inquiry result, whereby the speed of a response to the user operation can be increased. When the usable power is lower than the required power of the inquiry, a device with a priority lower than the device which has transmitted the inquiry is instructed to reduce the electric power thereof, whereby a device with a higher priority can be used. Further, a shut-off of a breaker can be prevented.

Means for Solving the Problem

In order to solve the above-described problems, the present invention provides a power control system comprising: a home appliance connected wirelessly or via cable through a communication network section, or an adapter connected between a commercial power supply and the home appliance; and a power control device, wherein the home appliance or the adapter comprises: a power detecting section configured to measure or obtain power consumption of the home appliance or power consumption of a device connected to the adapter, wherein the power control device comprises: a current detecting section configured to detect a current flowing through one or more electrical systems of the commercial power supply; a voltage detecting section configured to detect a voltage of the commercial power supply; a power calculating section configured to calculate electric power from detection information of the current detecting section and the voltage detecting section; a transceiver section configured to communicate with the home appliance or the adapter connected between the commercial power supply and the home appliance; an upper limit setting section configured to set an upper limit of a current flowing through the current detecting section; a priority setting section configured to set a use priority of the home appliance or the adapter; and a power control instructing section configured to output alarm notification or a power control instruction to the home appliance or the adapter when it is detected that the current flowing through the current detecting section is equal to or larger than a current value set by the upper limit setting section, wherein when the home appliance or the device connected to the adapter is operated, an inquiry about whether the home appliance or the device is usable is transmitted to the power control device, and an operation of the home appliance or the device connected to the adapter is controlled according to the inquiry result, and wherein the power control device outputs a power control instruction to a device which has a lower priority set by the priority setting section than the device which has transmitted the inquiry, based on a content of the inquiry and the detection information of the current detecting section as necessary.

According to the power control system and the method and program for controlling the power control system of the present invention, the power control device includes the priority setting section capable of setting the use priority of home appliance connected wirelessly or via cable or an adapter connected to the home appliances. Accordingly, if the power control device sets the setting value of the upper limit setting section as a rated value for shut-off of a breaker, information on the required power to be used is received from the device when the home appliance (including a home appliance connected to the adapter) is operated, and electric power of a device with a lower priority than the operated device is reduced when there is no margin in the current detected by the current detecting section. Accordingly, since it is possible to prevent a shut-off of the breaker, it is possible to efficiently use the capacity of a rated current in order to operate the device. In addition, the power control device side does not need to monitor a power consumption state or a setting state such as an operation mode of the operated device. In addition, just by transmitting the information such as usable power to a device, an operation or power reduction can be performed according to the received information on the request even if the device side does not perform complicated control processing. Accordingly, since a complicated information processing function is also unnecessary, the system can be built cheaply.

Further, the present invention provides a power control system comprising: a plurality of home appliances connected wirelessly or via cable through a communication network section; and a power control device, wherein the home appliance comprises: a power detecting section configured to measure or obtain power consumption of the home appliance and output the power consumption as a power signal; a home appliance information communication section configured to perform communication of a power information signal, a power control signal, or home appliance operation information with the power control system and other home appliances through the communication network section; and a home appliance control section configured to control the home appliance based on the power control signal obtained from the home appliance information communication section and the power signal from the power detecting section, wherein the power control device comprises: a current detecting section configured to detect a current flowing through one or more electrical systems of the commercial power supply; a voltage detecting section configured to detect a voltage of the commercial power supply; a power calculating section configured to calculate electric power from detection information of the current detecting section and the voltage detecting section; a power control communication section configured to communicate with the home appliance; a current upper limit setting section configured to set an upper limit of a current flowing through the current detecting section; a power upper limit setting section configured to set an upper limit of the electric power calculated by the power calculating section; a priority setting section configured to set a use priority of the home appliance; and a power control section configured to receive inputs of the current upper limit from the current upper limit setting section, the power upper limit from the power upper limit setting section, the priority from the priority setting section, and the communication information of the home appliance from the power control communication section, and to decide the electric power value of the home appliance as the power control signal and output the power control signal to the power control communication section, wherein when a first home appliance which is one of the plurality of home appliances is operated, the first home appliance transmits an inquiry including the operation information to the power control device, and wherein the power control section of the power control device outputs the power control signal for reducing a current or electric power to a home appliance having a lower priority set by the priority setting section than the first home appliance, when the power control section determines that it is necessary to reduce a current or electric power in order to enable the first home appliance to be used.

According to the configuration and the operation of the present invention, the power control section of the power control device controls electric power of a device autonomously. Therefore, since a user does not need to control electric power with his or her hands, the user can save time and effort. In addition, since electric power of a device is controlled according to the priority, a device with a high priority for the user can be used without inconvenience.

Advantages of the Invention

According to the power control system and the method and program for controlling the power control system of the present invention, the power control device includes the priority setting section capable of setting the use priority of home appliance connected wirelessly or via cable or an adapter connected to the home appliances. Accordingly, if the power control device sets the setting value of the upper limit setting section as a rated value for shut-off of a breaker, information on the required power to be used is received from the device when the home appliance (including a home appliance connected to the adapter) is operated, and electric power of a device with a lower priority than the operated device is reduced when there is no margin in the current detected by the current detecting section. Accordingly, since it is possible to prevent a shut-off of the breaker, it is possible to efficiently use the capacity of a rated current in order to operate the device. In addition, the power control device side does not need to monitor a power consumption state or a setting state such as an operation mode of the operated device. In addition, just by transmitting the information such as usable power to a device, an operation or power reduction can be performed according to the received information on the request even if the device side does not perform complicated control processing. Accordingly, since a complicated information processing function is also unnecessary, the system can be built cheaply.

According to the power control system of the present invention, when a first home appliance which is one of a plurality of home appliances is operated, an inquiry including the operation information is transmitted to the power control device, and the power control section of the power control device outputs a power control signal for reducing a current or electric power to a home appliance, which has a lower priority set by the priority setting section than the first home appliance, when it is determined that reducing a current or electric power is necessary in order to enable the first home appliance to be used. As a result, time and effort of the user can be saved.

In addition, since electric power of a device is controlled according to the priority, a device with a high priority for a user can be used without inconvenience.

BRIEF DESCRIPTION OF THE DRAWINGS

FIG. 6 is a view showing a table for conversion between an operation mode, such as each IH coil or a grill of an IH cooking heater, and required power.

FIG. 7 is a view showing a table managed by a management section of the power control device.

FIG. 15 is a flow chart showing the processing operation of a device in a conventional power control system.

DETAILED DESCRIPTION OF THE PREFERRED EMBODIMENTS

Figure 1:
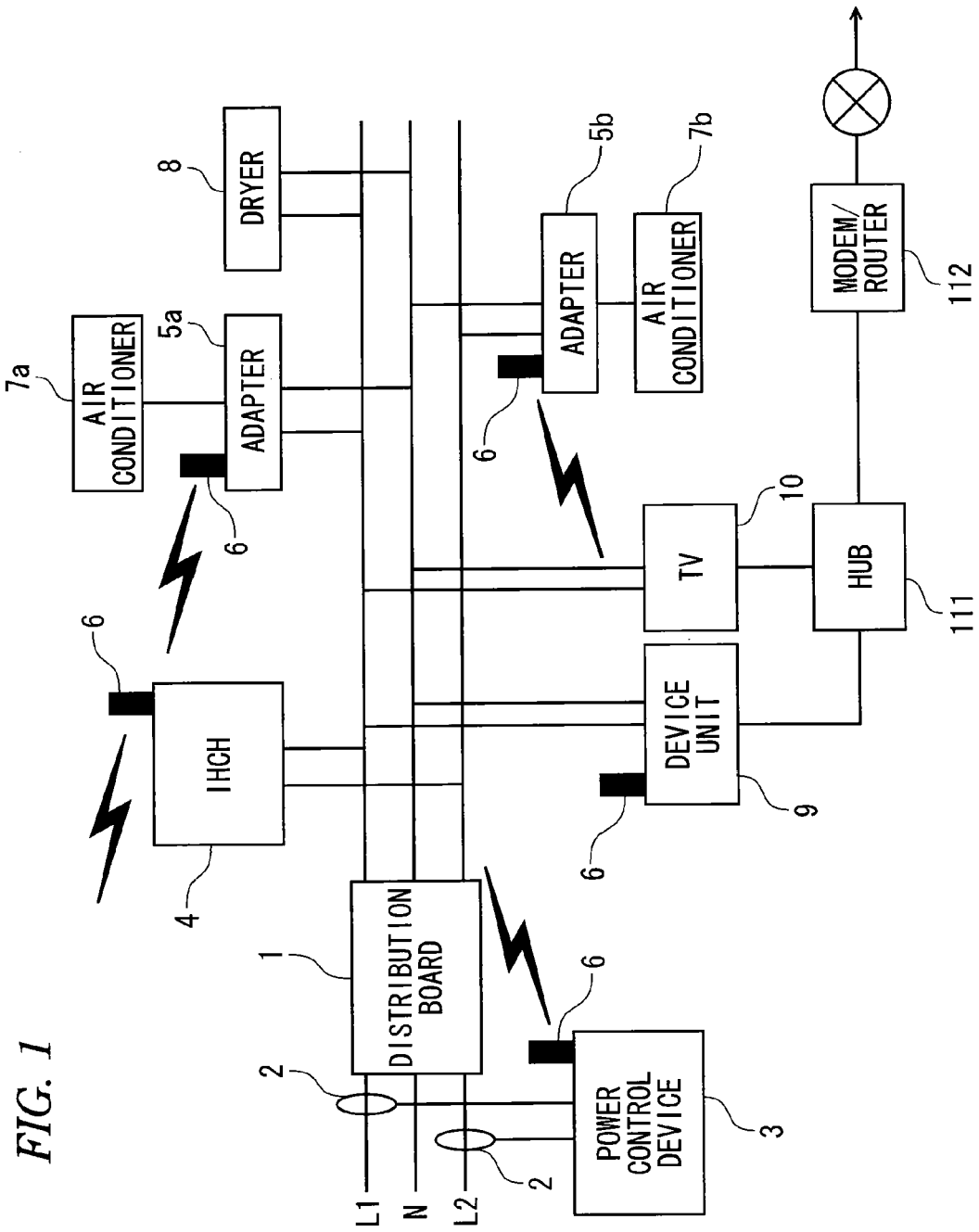
FIG. 1 is a view showing the system configuration of a power control system of the present invention.

According to a first invention, a power control system includes: a home appliance connected wirelessly or via cable through a communication network section, or an adapter connected between a commercial power supply and the home appliance; and a power control device, wherein the home appliance or the adapter includes: a power detecting section configured to measure or obtain power consumption of the home appliance or power consumption of a device connected to the adapter, wherein the power control device includes: a current detecting section configured to detect a current flowing through one or more electrical systems of the commercial power supply; a voltage detecting section configured to detect a voltage of the commercial power supply; a power calculating section configured to calculate electric power from detection information of the current detecting section and the voltage detecting section; a transceiver section configured to communicate with the home appliance or the adapter connected between the commercial power supply and the home appliance; an upper limit setting section configured to set an upper limit of a current flowing through the current detecting section; a priority setting section configured to set a use priority of the home appliance or the adapter; and a power control instructing section configured to output alarm notification or a power control instruction to the home appliance or the adapter when it is detected that the current flowing through the current detecting section is equal to or larger than a current value set by the upper limit setting section, wherein when the home appliance or the device connected to the adapter is operated, an inquiry about whether the home appliance or the device can be used is transmitted to the power control device, and an operation of the home appliance or the device connected to the adapter is controlled according to the inquiry result, and wherein the power control device outputs a power control instruction to a device which has a lower priority set by the priority setting section than the device which has transmitted the inquiry, based on a content of the inquiry and the detection information of the current detecting section as necessary. If the power control device sets the setting value of the upper limit setting section as a rated value for shut-off of a breaker, information on the required power to be used is received from the device when the home appliance (including a home appliance connected to the adapter) is operated, and electric power of a device with a lower priority than the operated device is reduced when there is no margin in the current detected by the current detecting section. Accordingly, since it is possible to prevent a shut-off of the breaker, it is possible to efficiently use the capacity of a rated current in order to operate the device. In addition, the power control device side does not need to monitor a power consumption state or a setting state such as an operation mode at the device side. In addition, just by transmitting the information such as usable power to a device, an operation or power reduction can be performed according to the received information on the request even if the device side does not perform complicated control processing. Accordingly, since a complicated information processing function is also unnecessary, the system can be built cheaply.

According to a second invention, especially in the power control device of the first invention, if an operation of the home appliance or an operation of a device connected to the adapter is an operation related to transition to a mode in which power consumption of the device does not increase, the operation of the home appliance or the device connected to the adapter is controlled according to an instruction of the operation without transmitting the inquiry about whether the home appliance or the device can be used to the power control device. In this case, since an inquiry is not always transmitted to the power control device whenever a device is operated, communication traffic can be reduced, and power consumption can be reduced by the reduction in communication traffic.

According to a third invention, especially in the power control device of the first or second invention, when the home appliance or the device connected to the adapter is operated, a content of the inquiry about whether the home appliance or the device can be used which is transmitted to the power control device includes a required power value, and the inquiry result includes information containing a usable power value. In this case, even if the power control device does not check which kind of device the home appliance or the device connected to the adapter is, the power control device can control the home appliance or the adapter to operate within the usable power value of the inquiry result since the usable power value is included in the inquiry result. Therefore, complicated information transmission and reception or processing is not necessary.

According to a fourth invention, especially in the power control device of the third invention, one of the home appliances is an IH cooking heater. In this case, if the priority of the IH cooking heater is set to be high, the user does not have to worry about the shut-off of a breaker at the time of cooking for a meal preparation.

According to a fifth invention, especially in the power control device of the fourth invention, when the IH cooking heater is operated for transition to a mode in which output power thereof increases, an inquiry is transmitted to the power control device together with information including required power. When the required power is added in a current state, and a current exceeding the upper limit set by the high limit setting section is expected to flow, the power control device tries to secure the required power by performing a control to reduce electric power of a device with a lower priority than the IH cooking heater so as to use the IH cooking heater as mach as possible. If the priority of the IH cooking heater is set to be high, it is possible to perform control to reduce electric power of a device with a lower priority by operation of the IH cooking heater, so that the IH cooking heater can be used. Therefore, the user does not need to wait until the total power consumption at home is reduced or does not need to go to stop a device, which consumes a large amount of power, at the time of cooking for a meal preparation.

According to a sixth invention, especially in the power control device of the fifth invention, the IH cooking heater includes a device output power deciding section configured to decide to operate in a mode within usable power of the inquiry result when required power cannot be secured even though the power control device has controlled the device with the lower priority than the IH cooking heater. For example, when a user can set an output level of ten level (maximum output=10) heating, the heating level is determined within the usable power and output so that the IH cooking heater operates with an output of level 9 as long as it can be used at the level 9 even if the required power when the user has performed an operation corresponding to the level 10 cannot be secured. In this case, "heating", "cooking", "boiling", "fried", and the like using the IH cooking heater can be started with a small amount of power, unlike ON/OFF control. Accordingly, the user does not need to wait until the total power consumption at home is reduced or does not need to go to stop a device, which consumes a large amount of power, at the time of cooking for a meal preparation. In addition, by setting the priority of the IH cooking heater high, it is possible to perform control to reduce electric power of a device with a lower priority by operation of the IH cooking heater, so that the IH cooking heater can be used if possible.

According to a seventh invention, especially in the power control device of any one of the first to sixth inventions, in a case in which the home appliance or the device connected to the adapter is an air conditioner, when electric power reduction is requested from the power control device, an instruction to change an operation mode of the air conditioner to a fan mode is given. Since this is not stopping the air conditioner but stopping a compressor of the air conditioner by changing the operation mode to the fan mode, power consumption of the air conditioner can be greatly reduced. In addition, even if the user sees the air conditioner, the user does not misunderstand that the air conditioner is stopped because the air conditioner is operating in the fan mode. Accordingly, there is no concern about failure of the air conditioner.

According to an eighth invention, especially in the power control device of any one of the first to seventh inventions, at least one device included in the power control system includes a display section configured to display information including power consumption of the device collected in the power control system. When a current exceeding the upper limit set by the upper limit setting section flows or the power consumption of a device with a low priority is reduced, it is notified through the display section. Accordingly, since the user can check the details of the control by watching the display section, the user can see that home appliances and the like operate differently. As a result, the user feels relieved.

According to a ninth invention, especially in the power control system of any one of the first to eighth inventions, at least one device included in the power control system includes a Web server, and a device such as a personal computer or a television including a Web browser uses the Web browser as a display section to display information containing power consumption collected by the device including the Web server through a network. In this case, since the home appliances, the adapter, or the power control device does not need to mount a display device, such as liquid crystal display, therein, the home appliances, the adapter, or the power control device can be made cheaply.

According to a tenth invention, there is provided a method for controlling a power control system including a home appliance connected through a communication network section or an adapter connected between a commercial power supply and the home appliance, and a power control device. In the method, the home appliance or the adapter performs: a usable power inquiry transmitting step of transmitting an inquiry to the power control device together with information including required power when the home appliance is operated for transition to a mode in which output power thereof increases; an inquiry result receiving step of receiving an inquiry result; and an operation control step of controlling an operation according to the inquiry result. In this case, since a device can operate according to the inquiry result from the power control device, the device side can operate or reduce the power consumption according to the received information even if the device side does not perform complicated control processing. Accordingly, since a complicated information processing function is not necessary either, the system can be built cheaply.

According to an eleventh invention, there is provided a method for controlling a power control system including a home appliance connected through a communication network section or an adapter connected between a commercial power supply and the home appliance, and a power control device. In the method, in a case in which the home appliance is an IH heater, a method for controlling the IH heater includes: a usable power inquiry transmitting step of transmitting an inquiry to the power control device together with information including required power when the IH heater is operated for transition to a mode in which output power of the IH heater increases; an inquiry result receiving step of receiving an inquiry result; and a device output power deciding step of deciding to operate in a mode within usable power of the inquiry result when required power can not be as the inquiry result. For example, when a user can set an output level of ten level (maximum output=10) heating, the IH cooking heater can operate with an output of level 9 as long as it can be used at the level 9 even if the required power when the user has performed an operation corresponding to the level 10 cannot be secured. Accordingly, the user does not need to wait until the total power consumption at home is reduced or does not need to go to stop a device, which consumes a large amount of power, at the time of cooking for a meal preparation.

According to a twelfth invention, there is provided a method for controlling a power control system including a home appliance connected through a communication network section or an adapter connected between a commercial power supply and the home appliance, and a power control device. In the method, a method for controlling the power control device includes: a priority setting step of setting a use priority of the home appliance or the adapter; a required power receiving step of receiving required power from the home appliance or the adapter; a margin power value calculating step of calculating, when the required power is received, a margin power value with respect to an upper-limit power value which is set based on an electric power value currently measured; a usable power responding step of sending a response to the home appliance or the adapter with the calculated margin power value as a usable power value; and a power reduction request step of outputting an instruction to reduce electric power of a device having a priority lower than the home appliance or the adapter which has transmitted the information regarding the required power, when the usable power is lower than the required power value. By outputting a control instruction to the home appliance or the adapter according to the priority, limited electric power at home can be efficiently used.

According to a thirteenth invention, there is provided a program causing a computer to realize at least some of the functions of the power control system of any one of the first to ninth inventions. Moreover, since this is a program, at least some of the refrigerators and the refrigerator systems of the present invention can be easily realized by making hard resources, such as electrical and information devices, a computer, and a server, cooperate with each other. In addition, distribution or installation of a program can be easily performed by recording the program on recording media or distributing a program using a communication line.

According to a fourteenth invention, there is provided a power control system including a plurality of home appliances connected wirelessly or via cable through a communication network section and a power control device, wherein the home appliance includes: a power detecting section configured to measure or obtain power consumption of the home appliance and output the power consumption as a power signal; a home appliance information communication section configured to perform communication of a power information signal, a power control signal, or home appliance operation information with the power control system and other home appliances through the communication network section; and a home appliance control section configured to control the home appliance based on the power control signal obtained from the home appliance information communication section and the power signal from the power detecting section, wherein the power control device includes: a current detecting section configured to detect a current flowing through one or more electrical systems of the commercial power supply; a voltage detecting section configured to detect a voltage of the commercial power supply; a power calculating section configured to calculate electric power from detection information of the current detecting section and the voltage detecting section; a power control communication section configured to communicate with the home appliance; a current upper limit setting section configured to set an upper limit of a current flowing through the current detecting section; a power upper limit setting section configured to set an upper limit of the electric power calculated by the power calculating section; a priority setting section configured to set a use priority of the home appliance; and a power control section configured to receive inputs of the current upper limit from the current upper limit setting section, the power upper limit from the power upper limit setting section, the priority from the priority setting section, and the communication information of the home appliance from the power control communication section, and to decide the electric power value of the home appliance as the power control signal and output the power control signal to the power control communication section, wherein when a first home appliance which is one of the plurality of home appliances is operated, the first home appliance transmits an inquiry including the operation information to the power control device, and wherein the power control section of the power control device outputs the power control signal for reducing a current or electric power to a home appliance having a lower priority set by the priority setting section than the first home appliance, when the power control section determines that it is necessary to reduce a current or electric power in order to enable the first home appliance to be used.

According to the configuration and the operation of the fourteenth invention, the power control section of the power control device controls electric power of a device autonomously. Therefore, since a user does not need to control electric power with his or her hands, the user can save time and effort. In addition, since electric power of a device is controlled according to the priority, a device with a high priority for the user can be used without inconvenience.

Moreover, according to a fifteenth invention, especially in the fourteenth invention, when the first home appliance is operated for a transition to a mode in which electric power of a device does not increase, the first home appliance does not transmit the inquiry to the power control device. Accordingly, when electric power of a device does not increase, communication is not performed since it is not necessary to adjust the total electric power. As a result, since it is possible to save useless time taken for communication, control, and the like, more real-time control can be performed.

Moreover, according to a sixteenth invention, especially in the fourteenth and fifteenth inventions, the power control section of the power control device stops transmission of the power control signal to the first home appliance until a drop in electric power by control of the home appliance having the lower priority is confirmed, and the first home appliance does not operate in response to the operation until the power control signal from the power control section of the power control device is input. Even if the power control signal is received, it takes time until electric power is actually reduced, in many cases, in order to ensure the quality and long life. Therefore, since electric power of the first home appliance is increased after checking that electric power has actually been decreased, the home appliance with higher reliability can be provided.

Moreover, according to a seventeenth invention, especially in addition to any one of the fourteenth to sixteenth inventions, the power control section gradually reduces electric power of the home appliance having the low priority by the power control signal. Accordingly, since electric power is gradually reduced, it is possible to suppress a decrease in user convenience caused by significant power reduction to some extent. In addition, a time for user action, such as location movement or menu change, can be given by controlling electric power gradually over time.

Moreover, according to an eighteenth invention, especially in addition to the seventeenth invention, the power control section of the power control device changes an amount of time variation at the gradual reduction of the electric power of the home appliance having the low priority, according to a type of the target home appliance. Therefore, since a time for which electric power is gradually reduced is changed according to the target home appliances, it is possible to reduce electric power while ensuring the quality of a device with a low priority and increasing the life of the device.

Moreover, according to a nineteenth invention, especially in addition to any one of the fourteenth to eighteenth inventions, the power control section gradually increases electric power of the first home appliance by the power control signal. Therefore, since it is possible to realize a home appliance with better rising of electric power, the home appliance with higher user convenience can be provided.

Moreover, according to a twentieth invention, especially in addition to the seventeenth invention, the power control section changes an amount of time variation at the gradual increase of the electric power of the first home appliance, according to a type of the first home appliance. Therefore, since the rising of electric power changes according to the kind of the first home appliance, it is possible to provide the home appliance with better convenience while ensuring the quality.

Moreover, according to a twenty-first invention, especially in addition to any one of the fourteenth to twentieth inventions, when the electric power of the first home appliance in operation cannot be secured even though the electric power is reduced by control of the home appliance having the low priority, the power control section outputs electric power not exceeding the power upper limit as maximum power, and the first home appliance operates with the electric power less than the maximum power indicated by the power control signal from the power control section of the power control device. Therefore, even in the case where the first home appliance operates, cutoff by a current limiter does not occur since the power upper limit is not exceeded. As a result, it is possible to provide a home appliance with higher user convenience.

Hereinafter, embodiments of the present invention will be described with reference to the drawings. In addition, these embodiments do not limit the present invention.

First Embodiment

Figure 2:
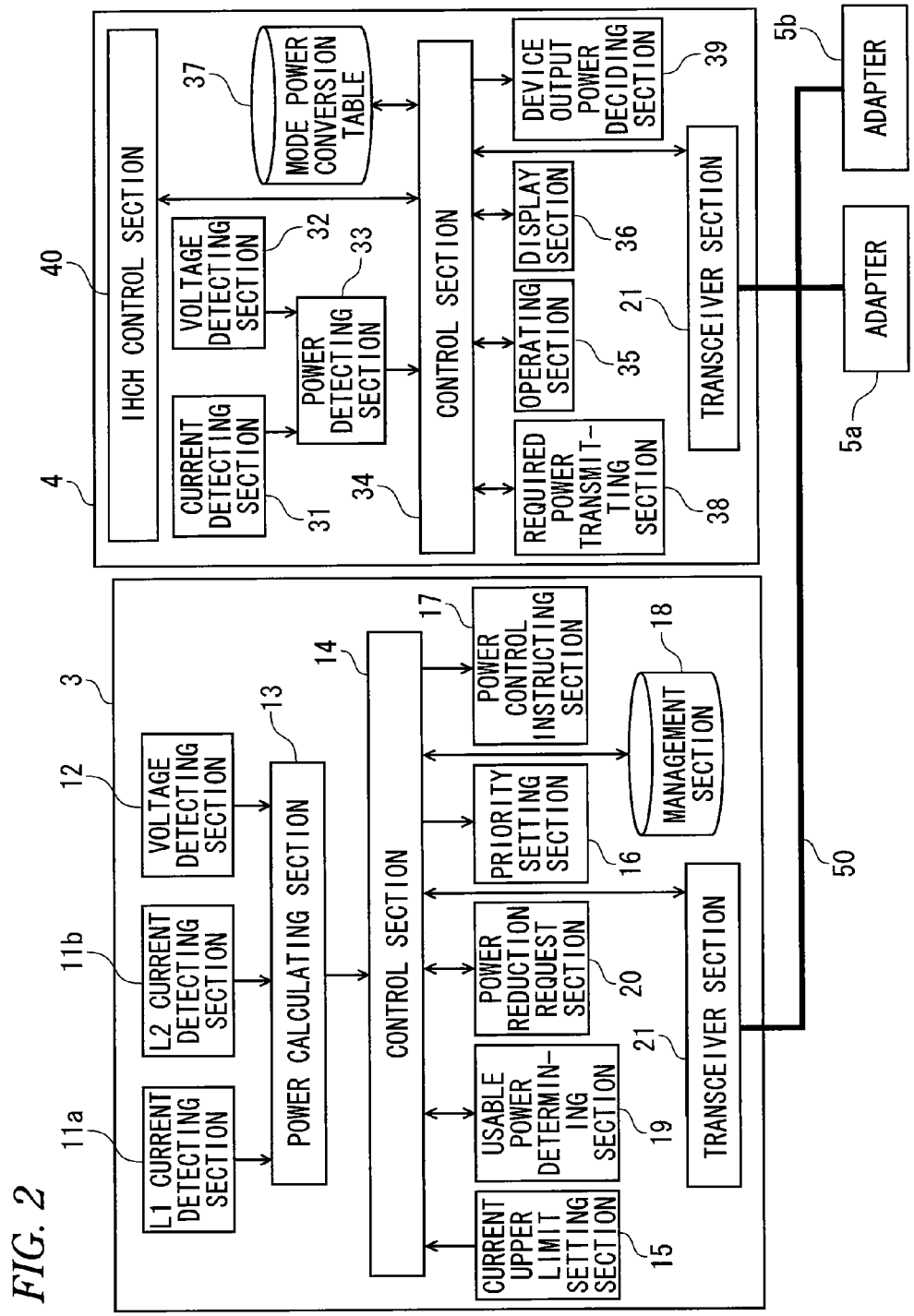
FIG. 2 is a block diagram showing a power control device of a power control system and an IH cooking heater.
Figure 3:
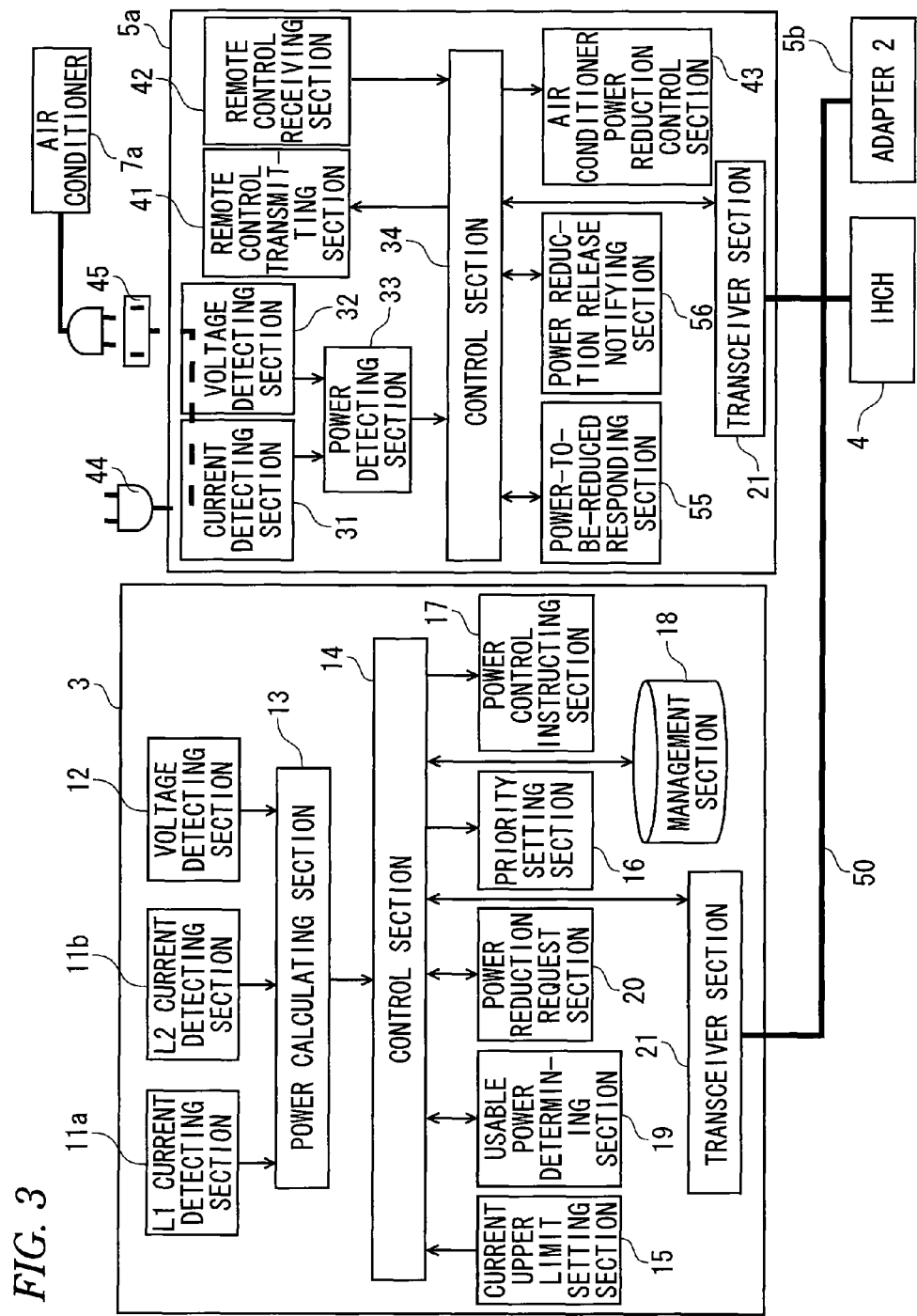
FIG. 3 is a block diagram showing an adapter connected to a power control device of a power control system and an air conditioner.

FIG. 1 is a view showing the system configuration of a power control system of the present invention, FIG. 2 is a block diagram showing a power control device of the power control system and an IH cooking heater, and FIG. 3 is a block diagram showing an adapter connected to the power control device of the power control system and an air conditioner.

In a first embodiment of the present invention, a current clamp 2 is interposed on a power line at the input side of a distribution board 1 for supply of single-phase three-wire 200 V into the home, and input currents L1 and L2 are measured by a power control device 3.

In addition, an IH cooking heater 4 as an AC 200 V system, an adapter 5a to which an air conditioner is connected in L1 phase, a dryer 8, and an adapter 5b to which an air conditioner is connected in L2 phase as an AC 100 V system, and a device unit 9 and a television 10 are connected to the output line of the distribution board. In addition, a radio communication device 6 is built in each of the power control device 3, the IH cooking heater 4, and the adapters 5a and 5b so that the information can be transmitted. In addition, specified low-power radio is used as a radio communication method, and communication is performed using a transmission frequency in a 400 MHz band.

In addition, since the device unit 9 includes the radio communication device 6, it is possible to intercept the radio communication data transmitted in a space with the same system. Accordingly, the information regarding each device can be collected. In addition, a Web server is mounted as software in the device unit 9. Accordingly, the device unit 9 is a unit which can be constructed cheaply since a display unit capable of displaying a text, an image, or the like is not provided.

In addition, the device unit 9 and the television 10 are connected to each other through a hub 111 in a general-purpose network. The television 10 includes a Web browser, so that the information and the like collected by the device unit 9 can be browsed by screen display using a Web browser of a device with a Web client function, such as the television 10 or a personal computer (not shown), through a general-purpose network.

In addition, the general-purpose network is not particularly designated physically, and any network may be used if it is a network through which transmission and reception using an HTTP protocol are possible.

In addition, the television may be connected to the Internet through a modem/router 112.

In addition, although many other devices are connected at real home, the following explanation will be given using the above configuration for simplicity of explanation.

FIG. 2 is a block diagram of the power control device 3 of the power control system and the IH cooking heater 4. The power control device 3 includes an L1 current detecting section 11a which measures a current flowing through an L1-phase power system line of single-phase three-wire 200 V, an L2 current detecting section 11b which measures a current flowing through an L2-phase power system line of single-phase three-wire 200 V, and a voltage detecting section 12 which measures a voltage with the L1 phase or the L2 phase. A power calculating section 13 calculates a power value on the basis of the current values and the voltage value measured by the L1 current detecting section 11a, the L2 current detecting section 11b, and the voltage detecting section 12. In addition, an L1-phase input power value, an L2-phase input power value, an input power value of both phases of L1 and L2, and the like are calculated as electric power.

A control section 14 performs arithmetic processing of the input information or data and generates or transmits a control signal or data.

A current upper limit setting section 15 sets the upper limit of a current value flowing in the L1 phase or the L2 phase. Regarding the setting of the upper limit, it is preferable to set the upper limit as an initial value in advance and to use an input section, such as a switch, or an external terminal to set the upper limit from a dedicated terminal, a personal computer, or the like when a change is necessary. It is assumed that the initial value of 30 A is used in the present embodiment.

A priority setting section 16 determines the use priority of a device. Setting of the priority is set by a user by providing a DIP switch at the device side, for example. When the device is turned on or the setting is changed, the priority information is transmitted to the power control device 3, the power control device 3 receives the priority information from the device and sets and checks the priority of the device using the priority setting section 16, and a management section 18 updates the priority information of the managed data. In addition, as another method, a priority setting screen may be displayed on a television screen using the device unit 9 or the television 10 so that the user can freely set the priority of a connected device on the television screen using a remote control of the television.

A power control instructing section 17 outputs a reduction request to a device or an adapter when it is necessary to reduce the power consumption of the device. A device or the amount of reduced power which is reduced by the reduction request is determined using the content of an inquiry by operation of a device, the amount of electric power calculated by the power calculating section 13, or the data of the management section 18.

The management section 18 manages as data the above-described priority information, information regarding power consumption of a device, or a set value or states, such as a power reduction control state of a device, and stores information other than the information regarding power consumption of a device in a nonvolatile memory, such as an EEPROM, so that the data is not erased even if the supply of electric power is stopped.

A usable power determining section 19 calculates a difference between the current upper limit set by the current upper limit setting section 15 and the current value measured by the L1 current detecting section 11a or the L2 current detecting section 11b and transmits a usable power value based on the difference in response to the inquiry from a device or to a device which suppresses the use of electric power. That is, this means that the device which has received the usable power value can be further used if it is electric power within the usable power value.

When the current value measured by the L1 current detecting section 11a or the L2 current detecting section 11b exceeds the current upper limit set by the current upper limit setting section 15, a breaker of the distribution board may operate. In this case, a power reduction request section 20 transmits a power reduction request to the device side with the excess as a power reduction value so that the power consumption is reduced. That is, when the device side reduces the power reduction request, the device reduces the power consumption.

A transceiver section 21 transmits and receives data through a communication network section 10 which performs radio communication.

As the IH cooking heater 4, a heater having functions of three IH coils and one grill is used. On the IH coil, functions such as "heating", "fried", "cooking", and "boiling", which can be set with output levels of 10 levels, can be used by user's selection. In addition, since a grill is controlled by a heater, it is possible to select a cooking mode based on several sequence patterns, such as "grilled fish". In addition, since the principles of heating of an IH cooking heater and the like are known, the explanation and illustration will be omitted.

The IH cooking heater 4 includes a current detecting section 31 which measures a current flowing through a single-phase power system line of 200 V and a voltage detecting section 32 which measures a voltage. A power calculating section 33 calculates the value of power consumption of the IH cooking heater 4 on the basis of the current value and the voltage value measured by the current detecting section 31 and the voltage detecting section 32.

The control section 34 performs arithmetic processing of the input information or data and generates or transmits a control signal or data.

An operating section 35 includes switches, such as buttons which select functions of "heating", "fried", "cooking", and "boiling" at each IH coil or the grill of the IH cooking heater. In addition, an electrostatic switch, a TACT SW, a touch panel, or the like may be used as a switch of the operating section 35. In addition, a display section 36 displays a mode display of a function selected by the operating section 35, an operating state under operation, and the like using an LED or a liquid crystal panel.

A mode power conversion table 37 is a table for conversion between a mode of each IH coil or a grill and required power (although detailed explanation will be given later, an example of the table is shown in FIG. 6).

A required power transmitting section 38 inquires of the power control device 3 about required power for the user operation referring to the mode power conversion table.

A device output power deciding section 39 decides a mode of maximum power within the usable power value using the mode transformation table 37 based on a usable power value received in response to the inquiry, and controls the IH coil or the heater to operate in a mode determined by an IHCH control section 40 through the control section 34.

FIG. 3 is a block diagram showing a power control device of a power control system and an adapter connected to an air conditioner. Since the power control device 3 is the same as that in FIG. 2, the same reference numeral is given thereto and the explanation will be omitted.

In an adapter 4, the same reference numeral is given to a section having the same function as in the IH cooking heater 4 shown in FIG. 2 and a different section will be described.

A remote control transmitting section 41 transmits a remote control signal from a remote control light-emitting element, and can transmit an operation mode such as cooling or heating of the air conditioner 7a, a temperature, the air volume, and the like as a remote control signal.

A remote control receiving section 42 receives a remote control signal from a remote control light-receiving element, and intercepts a remote control signal transmitted when operating a remote control attached to the air conditioner and stores the remote control signal data. This stored remote control signal data generates a stored remote control signal when canceling a power reduction state and transmits a remote control signal to the air conditioner.

An air conditioner power reduction control section 43 receives the information regarding reduced power or usable power from the power control device 3 and outputs a remote control signal for power reduction from the remote control transmitting section 41 to the air conditioner when power reduction is necessary. Specifically, the operation mode is changed to a "fan mode". An advantage of changing the operation mode to the "fan mode" is that power consumption of the air conditioner can be reduced to about tens of watt since a compressor of the air conditioner is stopped. In addition, when the user sees an indoor unit of the air conditioner, the user can see the wind come out. Accordingly, since the user does not misunderstand that the air conditioner is stopped, there is no concern about failure of the air conditioner.

In addition, the adapter 4 includes a power plug 44 and an outlet 45. By inserting the power plug 44 into the indoor outlet and plugging the air conditioner in the outlet 45, power consumption of the air conditioner can be checked.

Next, the operation of the power control system of the present invention will be described using flow charts in FIGS. 4(a), 4(b), 5(a), and 5(b) and data tables in FIGS. 6 and 7.

Figure 4B:
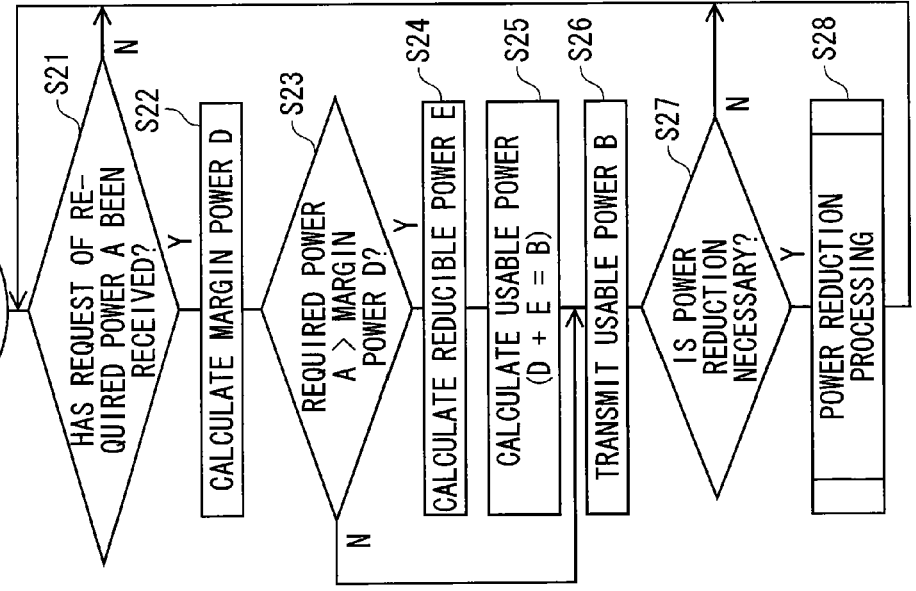
FIG. 4(b) is a flow chart showing an operation at the power control device side of the power control system when receiving an inquiry from the IH cooking heater.
Figure 4A:
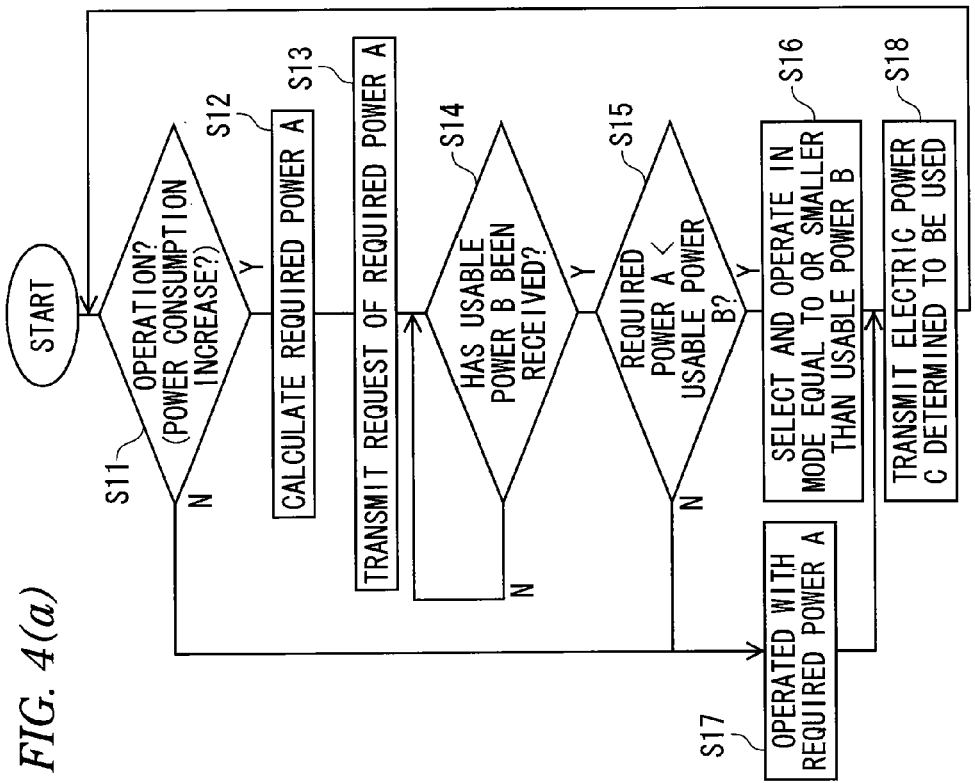
FIG. 4(a) is a flow chart showing an operation of an IH cooking heater when the IH cooking heater of the power control system is operated.
Figure 5A:
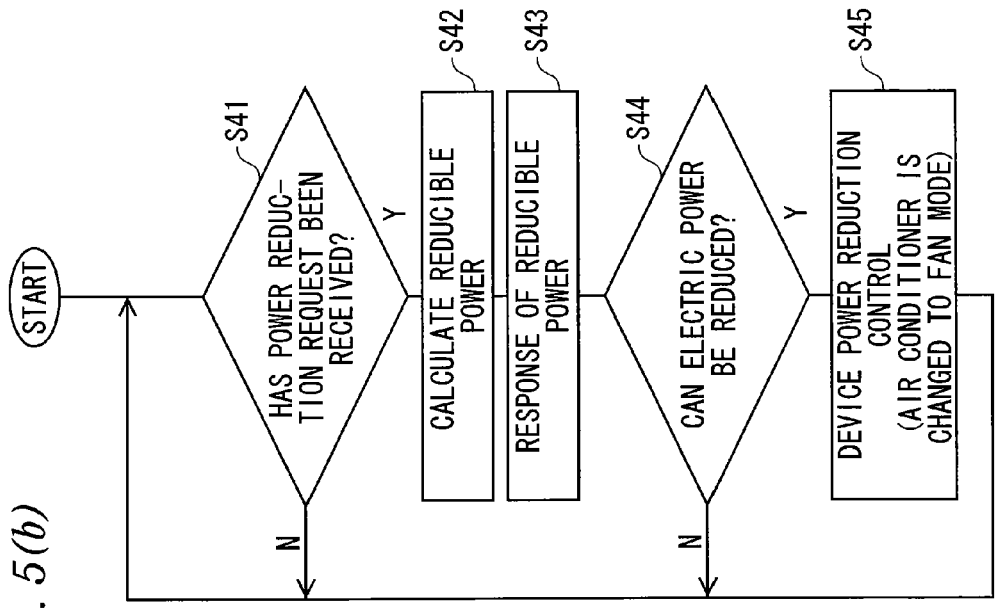
FIG. 5(a) is a flow chart showing an operation in power reduction processing of the power control device.
Figure 5B:
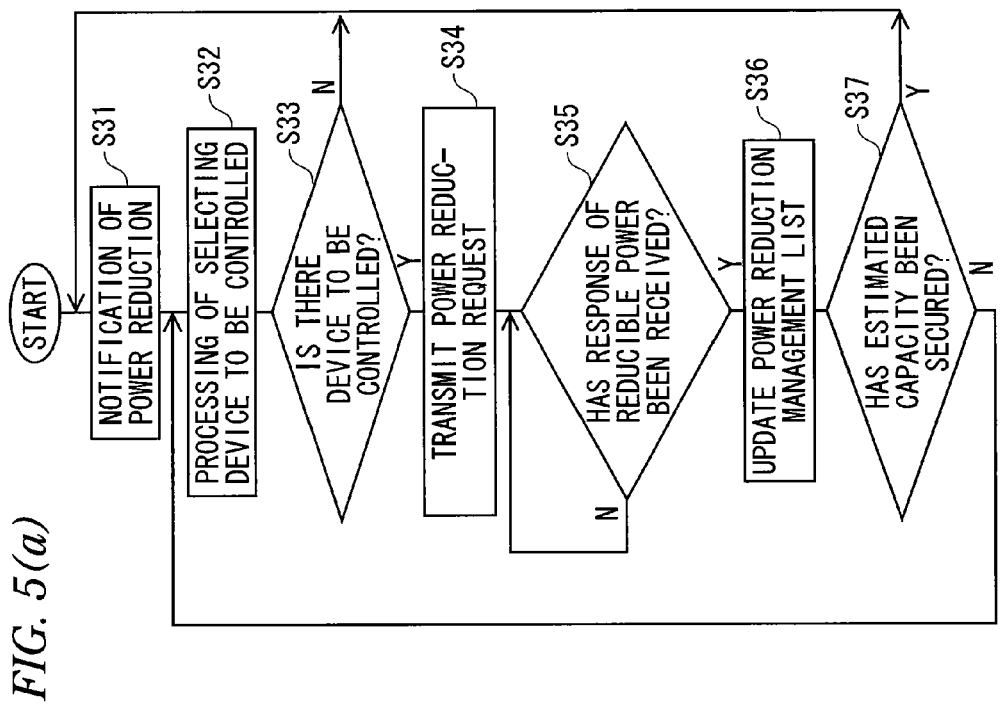
FIG. 5(b) is a flow chart showing an operation when an adapter to which an air conditioner is connected receives a power reduction request.

FIG. 4(a) is a flow chart showing an operation of an IH cooking heater when the IH cooking heater of the power control system is operated, and FIG. 4(b) is a flow chart showing an operation at the power control device side of the power control system when receiving an inquiry from the IH cooking heater when the IH cooking heater is operated. FIG. 5(a) is a flow chart showing an operation in power reduction processing of the power control device, and FIG. 5(b) is a flow chart showing an operation when an adapter to which an air conditioner is connected receives a power reduction request. In addition, the device side refers to adapters 5a and 5b to which the IH cooking heater 4 and the air conditioner are connected. FIG. 6 is an example of a table for conversion between an operation mode, such as each IH coil or a grill of an IH cooking heater, and required power. FIG. 7 is an example of a table managed by a management section of the power control device.

Hereinafter, FIGS. 4(*a*), 4(*b*), 5(*a*), 5(*b*), 6, and 7 will be described together.

In FIG. 4(*a*), in the IH cooking heater 4, when an operation for transition to a mode in which the heating level increases is performed (S11), the required power A is calculated (S12). Regarding the required power A, a table regarding a mode and power consumption shown in FIG. 6 is stored, an operate mode is compared with a current mode, and the power difference is treated as required power.

For example, when a user performs an operation of increasing the heating level to the level 7 while the IH cooking heater is operating left IH heating at the level 5, a difference value 700 W between the level 7 (1600 W) to the level 5 (900 W) is set as the required power A from FIG. 6. When the difference value is smaller than 0, the output power decreases. Accordingly, the IH cooking heater operates with the required power A without inquiring of the power control device 3 (S17).

That is, when an operation for transition to a mode in which the heating level does not increase is performed (S11), useless communication with the power control device is removed by operating the IH cooking heater with the required power A without inquiring of the power control device 3 about the required power (S17).

After returning to (S12) to calculate the required power A, an inquiry about a device to be used with the required power A is transmitted to the power control device 3 (S13). When usable power B is received from the power control device 3 as an inquiry result (S14), the required power A is compared with the electric power B (S15). If the required power A is smaller, an output mode is determined with reference to the mode power conversion table 37 (S16), and the determined power value is transmitted to the power control device 3 as electric power C determined to be used (S18).

In addition, as a method of determining a mode, in the case of "manual setting" shown in FIG. 6, a level down mode is selected if usable power is smaller than required power. In the case of "automatic cooking", control is made such that a device operates within the peak value of power consumption which is equal to or smaller than the usable power. In the case where it is not possible to make delicious rice if output power is changed, for example, like a rice cooker, automatic cooking is not started. As an example, assuming that the usable power is 500 W when the heating level is increased from the level 5 to the level 7, 500 W is added to the level 5 (900 W) which is a current mode. In this case, since electric power can be used up to 1400 W, the device is made to operate at the maximum level 6 which is equal to or smaller than 1400 W. Undoubtedly, when operating the device in a mode other than an operation instruction, it is preferable to reflect the display of the display section 36 or to give an alarm using a buzzer or the like because the device does not operate at a level that the user has operated.

On the other hand, as processing of the power control device 3, when the required power A is received from the IH cooking heater 4 (S21), the power margin D is calculated by acquiring a difference between the sum of current values detected by the L1 current detecting section 11a and the L2 current detecting section 11b and the current value (in the present embodiment, 30 A) set by the current upper limit setting section 15 and converting the margin from the rated current value into electric power (S22), as shown in FIG. 4(*b*).

If the margin power D is smaller than the received required power A (S23), there is a possibility that a breaker will shut off because the rated current is exceeded when the IH cooking heater operates with the required power A. For this reason, reducible power E which may be reduced from a device with a lower priority than the IH cooking heater is calculated (S24).

For example, FIG. 7 means that an air conditioner 1 operates with 600 W and an air conditioner 2 operates with 500 W when there are two air conditioners as devices with lower priorities than the IH cooking heater. As an example of the operation situation of an air conditioner, a notification is sent from the air conditioner side to a power control device when the power consumption changes by 100 W or more, and the power control device monitors the current power consumption of each device by sending an inquiry to each device periodically every minute. In addition, each of the two air conditioners in FIG. 7 is connected to an adapter, so that an operation of the air conditioner can be controlled through the remote control transmitting section 41 of the adapter.

As described above, in the case of power reduction, the air conditioner connected to the adapter uses electric power of 20 W since the operation mode is changed to the "fan" mode. Therefore, if electric power of the two air conditioners with low priorities is reduced, maximum 1060 W can be reduced.

That is, the margin power A and electric power, which can be reduced from a device with a low priority, are added, and devices with lower priorities are searched until the required power or more is secured.

As a result, usable power (D+E=B) is calculated by adding the margin power D and the reducible power E (S25), and the usable power B is transmitted to the IH cooking heater (S26).

When the margin power D is smaller than the required power A, it is necessary to reduce electric power of a device with a lower priority than the IH cooking heater (S27). Accordingly, power reduction processing is performed (S28).

Detailed processing of the power reduction processing is shown in FIG. 5(*a*). The operation will be described below with reference to FIG. 5(*a*) and FIG. 5(*b*), which is a processing at the adapter side, together.

When it is necessary to reduce the power, a notification that power reduction processing is performed is given by sound or display report that (S31). In addition, although not shown, a notification section which can be formed cheaply, such as an LED or a buzzer, is provided in the power control device 3.

Moreover, instead of the power control device, it is also possible to output an instruction of notification wirelessly to the device unit 9 so that the content of the notification can be checked on the television 10 in the case of the configuration shown in FIG. 1.

After the notification, processing of selecting a device to be controlled (S32) is performed.

Here, the device to be controlled is a device which has a radio communication device mounted therein and which can be controlled for power reduction. As shown in FIG. 6, the management section 18 searches for devices, which consume 100 W or more, in order of lower priorities (in FIG. 6, in order of higher priority values) in the table data which manages priorities and power consumption states of devices. If there is a device to be controlled (S33), a "power reduction request" is transmitted to the device through a communication network section 50 (S34).

On the other hand, when the "power reduction request" is received (S41), the device side calculates the reducible power (S42) and transmits the reducible power value to the power control device 3 (S43). If the electric power can be reduced, a power reduction instruction is output to the device side (S44), and the power consumption is reduced (S45).

As a specific example, when a user selects an operation in a heating mode of the level 9 (2500 W output expected) of a left IH coil for an IH cooking heater in a state where the IH cooking heater is in a stopped state while the air conditioner 1 is being used with electric power of 600 W and the air conditioner 2 is being used with electric power of 500 W, total electric power may become 3600 W (600 W+500 W+2500 W) exceeding 3000 W equivalent to the rated current of 30 A. Therefore, reduction of 600 W which is the excess from the rated power is requested.

In the case of an adapter to which the air conditioner 2 is connected, the air conditioner is operating in the "operation mode=heating operation (500 W)". Accordingly, when the adapter receives "electric power to be reduced=200 W", the adapter outputs an instruction, which is for changing the operation mode of the air conditioner to "fan mode (20 W)", from the air conditioner power reduction control section 43 to the remote control transmitting section 41, and the remote control transmitting section 41 outputs a remote control signal to the air conditioner. Therefore, electric power to be reduced, which is replied from a power-to-be-reduced responding section 55, becomes 480 W (500 W before reduction −20 W after reduction).

The power control device 3 will be described again. After transmitting a "power reduction request", a response of "reducible power" is received from the device side (S35). If the received "reducible power" is equal to or larger than 0 W, the device side performs power reduction control to change and update the received power reduction control state of the device to "OFF→ON" in the table data shown in FIG. 7 (S36).

Then, if the reducible power received as a response is smaller than the power reduction value requested by the power reduction request (S37), the power control device 3 searches for a device to be controlled in order to check whether or not there is a device whose electric power can be reduced (S32), since it is not still smaller than the current upper limit set by the current upper limit setting section 15. In the state shown in FIG. 6, processing of (S33) to (S37) is similarly repeated as a processing of performing power control of the air conditioner 1 with the next priority. This is performed until reducible power E is secured.

By performing such processing, an operation of a breaker at home is prevented so that a device with a high priority set by the user can be used if possible.

In addition, when a device connected to an adapter is an air conditioner, an operation mode of the air conditioner is changed to a fan mode. Since this is not stopping the air conditioner but stopping a compressor of the air conditioner by changing the operation mode to the fan mode, power consumption of the air conditioner can be greatly reduced. In addition, even if the user sees the air conditioner, the user does not misunderstand that the air conditioner is stopped because the air conditioner is operating in the fan mode. Accordingly, there is no concern about failure of the air conditioner.

Moreover, regarding "under power reduction control", if a display unit such as and LED is provided in a power control device and an adapter or a device under power reduction control and a display indicating "under power reduction control" is given, it is possible to notify the user that the device is operating in a state where electric power of the device has been reduced from the state set by the user. In addition, this may be displayed in detail on a screen of a television through a device unit for notification.

Moreover, in the explanation of the present embodiment, a device connected to an adapter is an air conditioner. In the case of a home appliance which can be controlled by a remote control, however, it can be controlled in the same method by setting it to a mode in which power consumption can be greatly reduced, such as "operation mode=fan mode", or a stop mode.

In addition, in the case of a device which does not have a remote control like home appliances, such as a jar pot or an electric stove, a function for shut-off may be mounted in an adapter using a relay, a semiconductor switch, or the like. In this case, a method may be used in which when a power reduction instruction is received from the power control device 3, the power supply is turned off to reduce electric power.

In addition, although transmission and reception of data have been performed using specified low-power radio communication, which does not require wires, as the communication network section 50 in the present embodiment, power line communication or cable connection is also possible.

Moreover, in FIG. 5(a) of the present embodiment, a power reduction request is transmitted to each device in the order of lower priorities in order to secure the reducible power E. However, since a device whose electric power is to be reduced and the amount of electric power are known, information regarding a plurality of device IDs, by which devices whose electric power is to be reduced can be uniquely distinguished, and information regarding the amount of electric power to be reduced for each device may be included in one-time transmitted telegram. In this case, it is possible to further reduce communication traffic and to increase the responsiveness.

In addition, although the operation when an IH cooking heater set to have a highest priority is operated has been described, two IH cooking heaters may be provided, or it is needless to say that an air conditioner be set to have a high priority.

In addition, in the present embodiment, an adapter is connected to an air conditioner and a power reduction instruction is given from the power control device to the adapter. However, the power control device may directly transmit or receive the data to or from the air conditioner by mounting a radio communication device in the main body of the air conditioner. In addition, when a function of the power reduction control is mounted in the main body of the air conditioner, limited electric power at home can be used more efficiently if the power reduction value requested by the power reduction request from the power reduction device can be reduced by operation change, such as lowering the number of revolutions of a compressor, for example.

In addition, all components of the present embodiment are all or some of constituent components of the power control system, and a program for causing a computer to function as them can be similarly configured.

In addition, the constituent components described in the present embodiment may be realized in the form of a program by which hardware resources, such as electrical and information devices including a CPU (or a microcomputer), a RAM, a ROM, storage and recording media, and an I/O, a computer, and a server cooperate with each other. In the form of a program, distribution and update of a new function or installation of a new function can be easily realized by recording the program on recording media, such as magnetic media or optical media, or distributing the program using a communication line, such as the Internet.

Second Embodiment

The configuration of a second embodiment of the present invention will be described with reference to FIG. 8. In FIG.

8, 61 denotes a first home appliance, and the first home appliance 61 is assumed to have a higher priority when using power than priorities of second and third home appliances 70 and 71. In addition, 62 denotes a power detecting section, and the power detecting section 62 measures electric power used by the first home appliance 61 and outputs it as a power information signal. 65 denotes a home appliance control section, and a power information signal detected by the power detecting section 62 and a home appliance control signal acquired by a home appliance information communication section 64 are input to the home appliance control section 65. The home appliance control section 65 outputs a control signal on the basis of the power information signal and the home appliance control signal and controls an object to be controlled 63, for example, a set temperature of an air conditioner and the heating amount of an IH cooking heater. 84 denotes an operating section, and the operation of the first home appliance 61 is performed by the user. A required power storage section 85 outputs, as a required power signal, required power when an operation using the operating section 84 is performed. In addition, 86 denotes a device information storage section, and the device information storage section 86 stores the device information regarding the first home appliance 61 and outputs it as a device information signal.

The home appliance information communication section 64 transmits the power information signal of the power detecting section 62, the control signal of the home appliance control section 5, the required power signal of the required power storage section 85, and the device information signal of the device information storage section 86 to the outside through an antenna 66, and receives the home appliance control signal from the outside through the antenna 66.

A current is supplied to the first home appliance 61 through an electric wire 72, an outlet 68 set on the electric wire 72, a plug 67, and a home appliance wire 69. As described above, electric power of the first home appliance 61 is measured by the power detecting section 2.

In addition, second and third home appliances 70 and 71 have the same configuration as the first home appliance 61. Accordingly, the second and third home appliances 70 and 71 transmit a power information signal and a control signal to the outside through the antenna 66 and receives a home appliance control signal from the outside through the antenna 66 in the same manner as described above.

The plugs 67 of the first to third home appliances 61, 70, and 71 are connected to the electric wire 72 through the outlet 68, and electric power is supplied from the outdoor power panel through the power control device 73.

A current detecting section 74 measures a current of the power control device 73, and a voltage detecting section 75 measures a voltage of the power control device 73. The current measured by the current detecting section 74 and the voltage measured by the voltage detecting section 75 are input to a power calculating section 76, and the power calculating section 76 calculates electric power and outputs the value as total electric power. A power control communication section 77 is connected to the antenna 66, and transmits or receives the information to or from each home appliance information communication section of the first to third home appliances 61, 70, and 71 through an electric wave 82.

A current upper limit setting section 78 stores a current value, at which the supply of electric power is stopped due to overcurrent detection performed by a current limiter 81 or a breaker, as a current upper limit. In addition, similarly, a power upper-limit setting section 79 stores a power value, at which the supply of electric power is stopped due to overcurrent detection performed by the current limiter 81, as a power upper limit. Whether to stop the supply of electric power after the current limiter 81 detects either an overcurrent or overpower differs depending on the kind of the current limiter 81.

In addition, 83 denotes a priority setting section. The priority setting section 83 stores the priority of power use when connected home appliances, in the example of FIG. 8, the first to third home appliances 61, 70, and 71 are used and outputs it as a priority signal. In addition, in the example of FIG. 8, the first home appliance 61 is set to have a first priority and the other devices are set to have a second priority.

The communication signal from each home appliance, the priority signal of the priority setting section 23, the current of the current detecting section 74, the electric power of the power calculating section 76, the current upper limit of the current upper limit setting section 78, and the power upper limit of the power upper-limit setting section 79 are input to a power control section 80. Electric power of home appliances which can be transmitted or received through an electric wave according to the priorities of home appliances, in the example of FIG. 8, the first to third home appliances 61, 70, and 71 is determined according to the priorities such that a current flowing through the power control device 73 does not exceed the current upper limit, and it is output to each of the home appliances as a power control signal.

Figure 8:
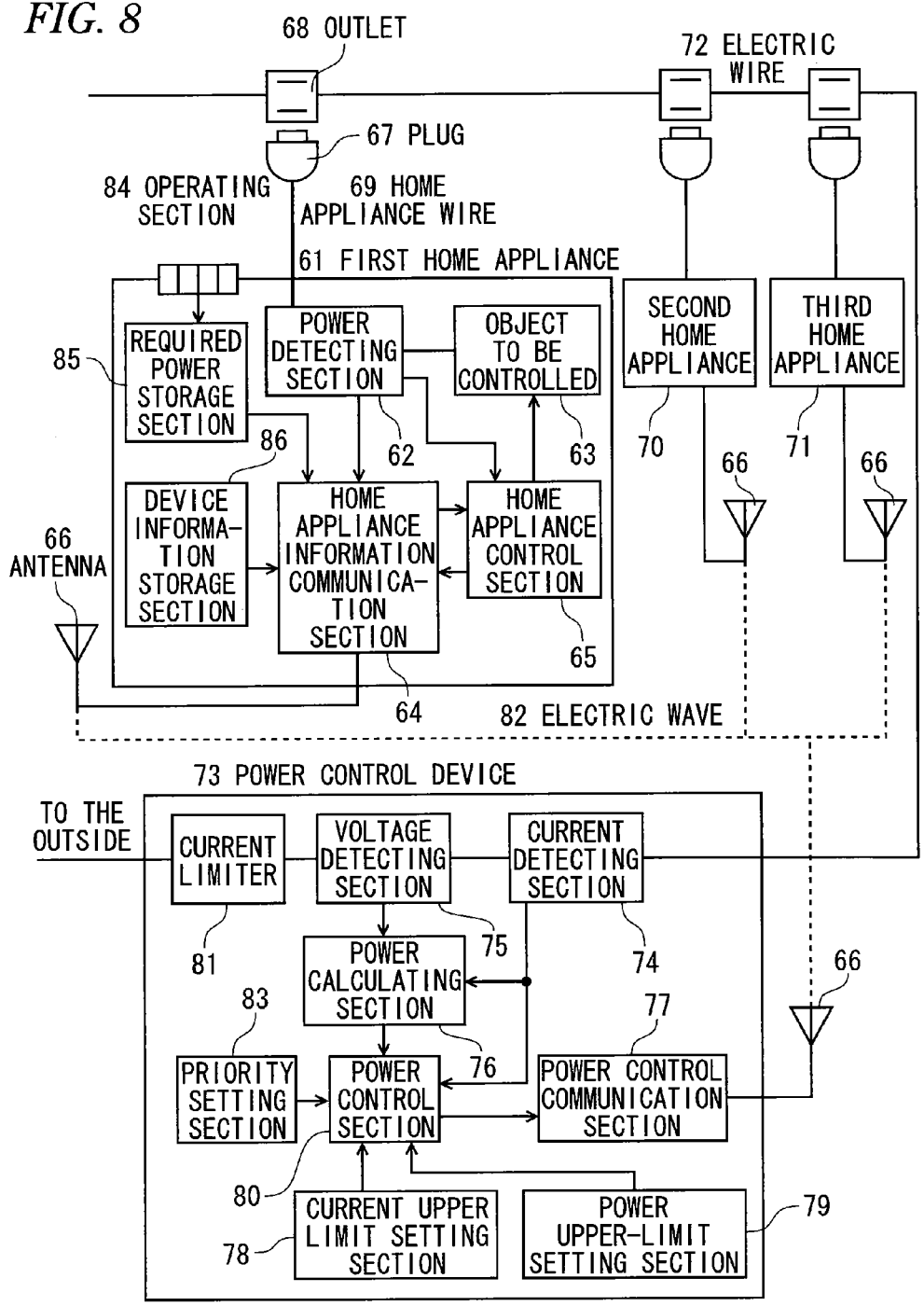
FIG. 8 is a view showing the system configuration of a power control system of the present invention.

Moreover, similarly, electric power of home appliances which can be transmitted or received through an electric wave according to the priorities of home appliances, in the example of FIG. 8, the first to third home appliances 61, 70, and 71 is determined according to required power of each device and the priorities such that electric power flowing through the power control device 73 does not exceed the power upper limit, and it is output to each of the home appliances as a power control signal.

Next, the operation of the first embodiment of the present invention will be described using FIGS. 9 to 12. First, the operation of the power control section 80 will be described using FIG. 9.

Figure 9:
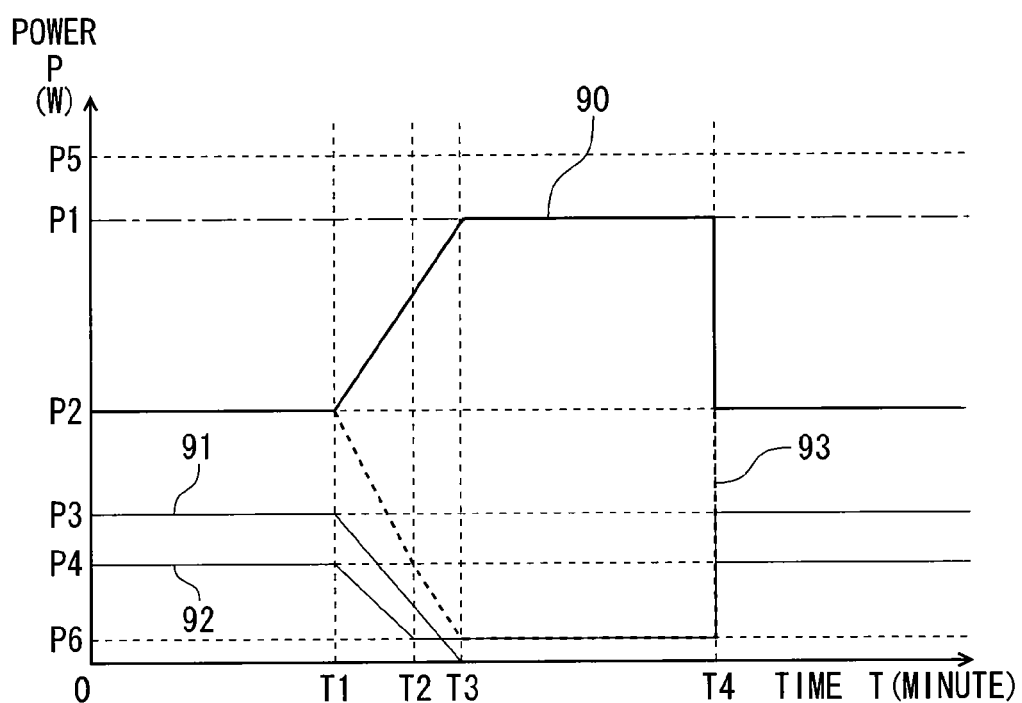
FIG. 9 is a view showing the relationship between electric power and time in order to explain the operation of a power control section.

FIG. 9 is a graph showing electric power P of each home appliance and total power, which is the sum of electric power of home appliances, in a state where a time is set on the horizontal axis and power is set on the vertical axis. In addition, cutoff power P1 of the current limiter 81 is also shown together.

Electric power P5 that the first home appliance 61 requires, electric power P3 that the second home appliance 70 requires, and electric power P4 that the third home appliance 71 requires are also shown together in FIG. 9. In addition, power upper limit P1 of the current limiter 81 is also shown together.

In FIG. 9, since the first home appliance 61 does not operate until time T1, total power P is electric power P2, that is, P3+P4 which is the sum of electric power P3 of the second home appliance 70 and electric power P4 of the third home appliance 71.

At time T1, a user operates the operating section 84 to request the use of the first home appliance 61, and the required power storage section 85 outputs electric power P5 required for the operation and transmits it to the power control section 80 through the home appliance information communication section 64, the antenna 66, and the power control communication section 77.

Assuming that the first home appliance 61 is used with the electric power P5, the total power P becomes P3+P4+P5 which is the sum of the home appliances. Referring to FIG. 9, this exceeds the power upper limit P1 which is cutoff power of the current limiter 81. As a result, since a power supply is turned off by the current limiter 81, a problem in that all home appliances cannot be used occurs.

Therefore, the power control section 80 controls electric power of each home appliance so that cutoff by the current limiter 81 does not occur. In this case, the power control section 80 performs control such that users of the second and third home appliances 70 and 71 do not feel uncomfortable if possible and durability and quality of the device are not deteriorated.

Hereinafter, specific power control will be described. In FIG. 9, if there is a request for use of the first home appliance 61 at time T1, the total power P exceeds P1, which is the power upper limit, significantly. Accordingly, electric power of the second and third home appliances 70 and 71 with low priorities is reduced. Electric power of the home appliances is controlled such that the second home appliance 70 operates with electric power indicated by 91 in FIG. 9 and the third home appliance 71 operates with electric power indicated by 92.

However, although electric power of the first home appliance 61 increases significantly in the example of FIG. 9, the electric power of the first home appliance 61 may not increase depending on an operation. In this case, communication with the power control device 73 is not performed. This is because it is not necessary to control electric power of other devices. Accordingly, useless time taken for communication, control, and the like can be saved.

Figure 10:
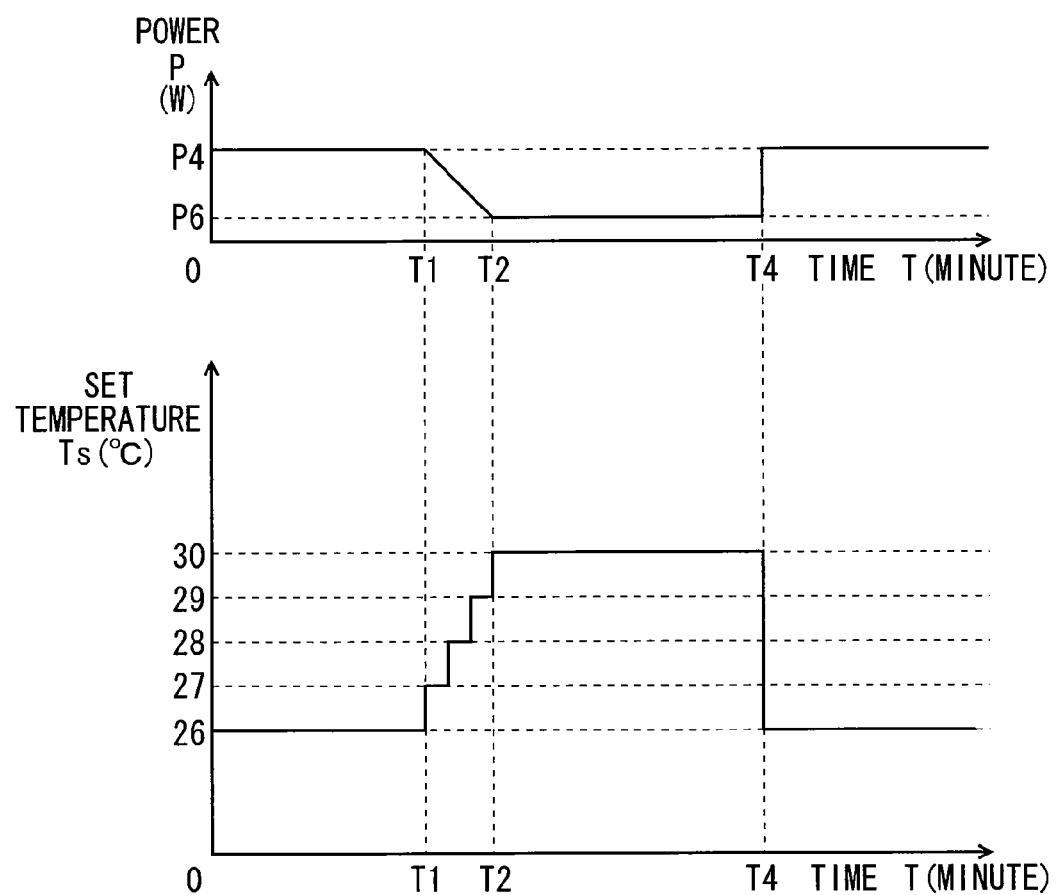
FIG. 10 is a view showing the relationship between the set temperature and electric power in order to explain the operation of a power control section.

Here, a method of reducing electric power of the second and third home appliances 70 and 71 will be described below using FIGS. 10, 11, and 12.

As an example, it is assumed that the second and third home appliances 70 and 71 are air conditioners and these are used for cooling. In order to reduce electric power of the air conditioner quickly, it is necessary to change the current cooling mode to an OFF mode or a fan mode. However, it is apparent that a sudden mode change will make the user feel uncomfortable. Therefore, by controlling the set temperature such that electric power decreases gradually as shown in FIG. 10, a decrease in comfort can be prevented to some extent using a method, such as urging a user to move from the installation place of the air conditioner by notifying the user of limitation of electric power caused by the use of the first home appliance 61.

Moreover, in the case of short-term pause, changing the set temperature without reducing electric power by setting to shut-off or a fan mode from the relationship between refrigerant and power consumption of an inverter may lead to energy saving as a result since electric power required for the next rising becomes small. In addition, an abrupt change in electric power may cause a problem in durability as can be seen from a decrease in durability of a relay caused by spark at the time of switching.

Although the above explanation is given using the air conditioner as an example, performing control such that electric power changes gradually without significantly reducing the electric power instantaneously is necessary from the point of view of comfort, energy saving, and durability.

As another example, in the case of an air conditioner, if it can be seen that electric power of the second and third home appliances 70 and 71 is increased again when electric power of the first home appliance 61 is decreased as shown in FIG. 9, operating the air conditioner with P6, which is minimum electric power from which immediate increase in electric power is possible, instead of turning off the power supply may be preferable from the point of view of comfort because electric power returns to the current electric power P3 immediately as shown at time T4 in FIG. 9. That is, it can be seen that setting minimum electric power is preferable occasionally on the assumption that a change in electric power occurs.

Therefore, the power control section 80 can suppress a decrease in user convenience, which is caused by significant power reduction, by reducing electric power gradually by a power control signal of a home appliance with a low priority. In addition, a time for user action, such as location movement or menu change, can be given by controlling electric power gradually over time.

In addition, changing this variation in the amount of reduction according to the kind of home appliances is preferable from the point of view of comfort and durability. That is, the power control section 80 can ensure the quality of a device with a low priority and increase the life of the device while reducing electric power by changing a time variation when reducing the electric power of the device with a low priority gradually according to the kind of target home appliances.

In addition, the time variation when reducing electric power of a device with a low priority gradually may become equal to or larger than a predetermined value unexpectedly. Therefore, when the time variation when reducing electric power of a device with a low priority gradually becomes equal to or larger than a predetermined value, the situation is notified to the power control section 80. In addition, the power control section 80 which has received the notification reduces electric power of another home appliance with a low priority gradually in order to reduce the amount of electric power more quickly. Alternatively, the power control section 80 which has received the notification informs the user that it takes a time to reduce the amount of electric power.

As shown in FIG. 9, electric power of the first home appliance 61 is controlled such that the total power P does not exceed the power upper limit P1 while observing electric power 31 of the second home appliance 70 and electric power 32 of the third home appliance 71. At time T3 at which reductions in the electric power 31 of the second home appliance 70 and the electric power 32 of the third home appliance 7 have ended, increasing electric power of the first home appliance 61 gradually while observing the electric power of the second and third home appliances 70 and 71 may be preferable rather than increasing the electric power of the first home appliance 61.

Figure 11:
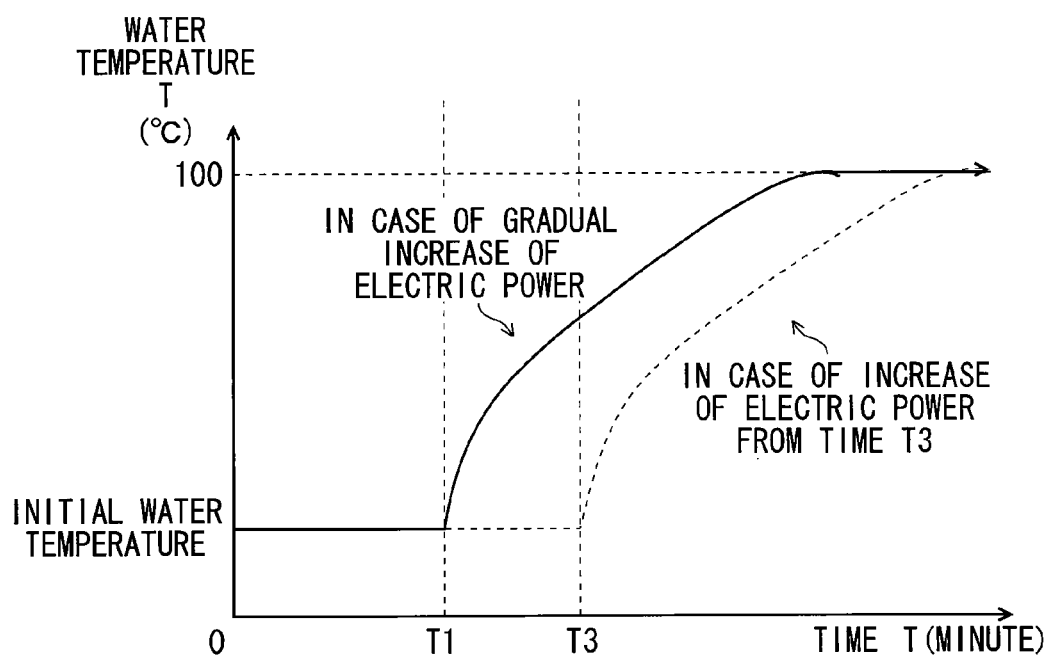
FIG. 11 is a view showing the relationship between the water temperature and time, which indicates the operation of a power control section.
Figure 12:
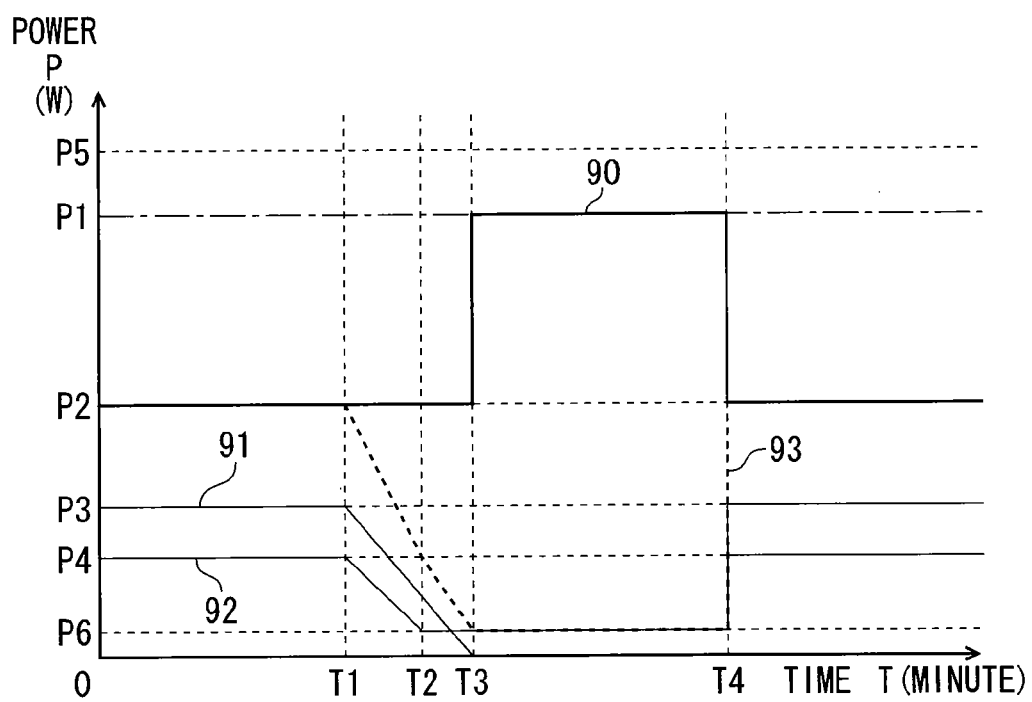
FIG. 12 is a view showing the relationship between electric power and time in order to explain the operation of a power control section.

As an example, when a boiling menu is operated in an IH cooking heater as the first home appliance 61, it is apparently possible to boil the water in the case of using electric power gradually from time T1 as shown in FIG. 11 compared with the case of using electric power from time T3. Therefore, since cooking including boiling ends quickly, it is possible to improve comfort and operability of the user.

However, when a rice cooker which needs large electric power from the beginning is the first home appliance as described above, operating the rice cooker at time T3 may be better than increasing electric power gradually like the IH cooking heater described above in terms of cooking performance that cooked rice is delicious. Accordingly, it can be seen that electric power of the first home appliance 61 needs to be changed according to the kind of the first home appliance 61.

Therefore, since the characteristic of the power control section 80 is to increase electric power by the power control signal of the first home appliance 61, it is possible to realize a home appliance with better rising of electric power. As a result, it is possible to provide the home appliance with higher user convenience.

In addition, since the power control device 20 changes a time variation when increasing electric power of the first home appliance 61 gradually according to the kind of the first home appliance 61, the rising of electric power changes according to the kind of the first home appliance 61. Accordingly, it is possible to provide a home appliance with better convenience.

In addition, when electric power at the time of operation of the first home appliance 1 cannot be secured even if electric power is reduced by control of a home appliance with a low priority as described in FIG. 9, the power control section 80 outputs electric power, which does not exceed the power upper limit, as maximum power, and the first home appliance 61 operates with the electric power less than the maximum power indicated by the power control section 80 of the power control device 73. Accordingly, even in the case where the first home appliance 61 operates, cutoff by a current limiter does not occur since the power upper limit is not exceeded. As a result, it is possible to provide the home appliance with higher user convenience.

In addition, even if the power control section 80 transmits a power control signal for reducing electric power to the second and third home appliances 70 and 71 due to communication failure or according to the kind of home appliances, it may take time until a change in electric power of the second and third home appliances 70 and 71 actually occurs. Therefore, a step is added in which transmission of a power control signal to the first home appliance 61 is stopped until power reduction based on control of a home appliance with a low priority is confirmed and the first home appliance 61 does not operate until the power control signal from the power control section 80 of the power control device 73 is input. Accordingly, since the power upper limit P1 is not exceeded, it is possible to provide a highly reliable home appliance.

Figure 13:
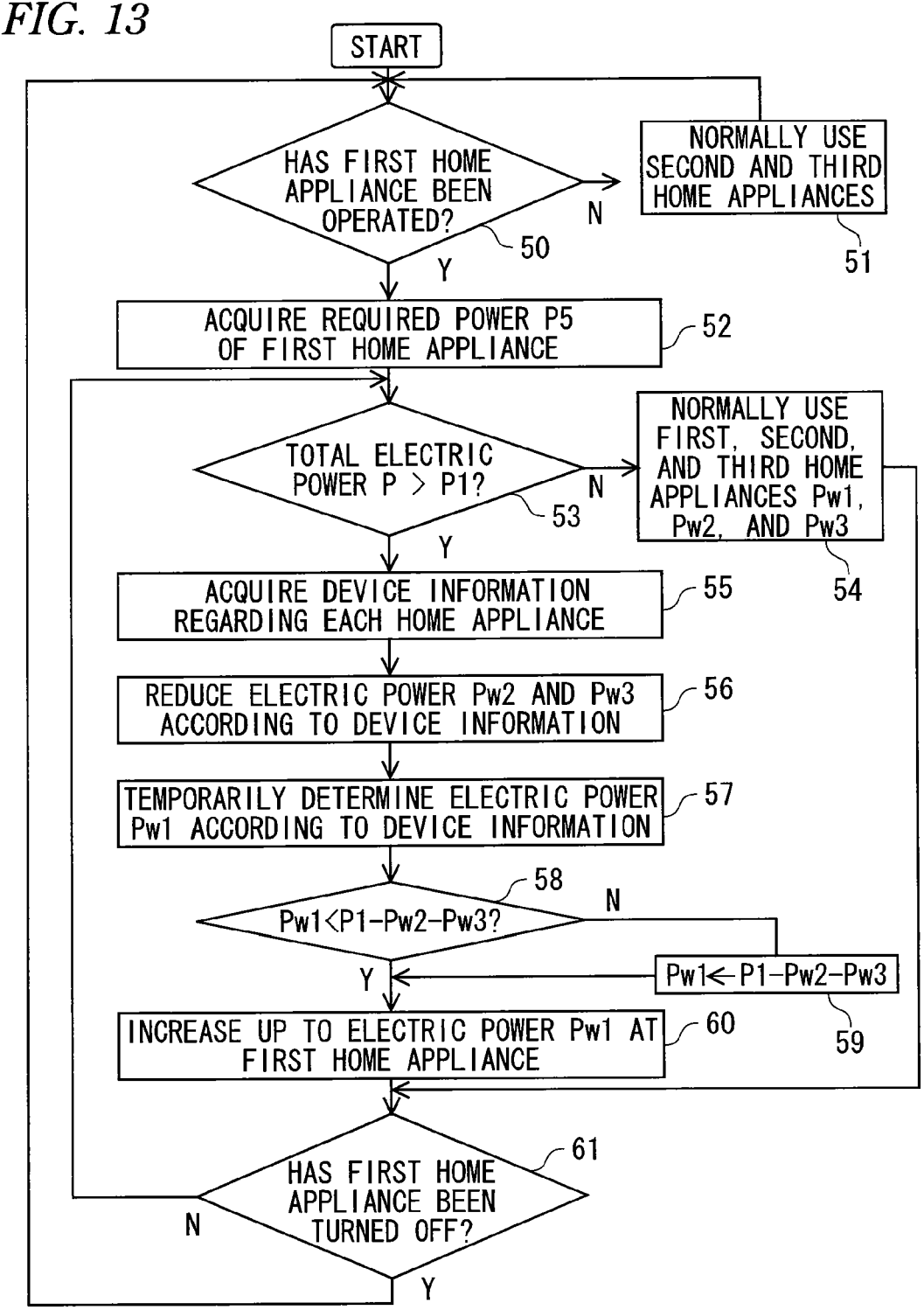
FIG. 13 is a flow chart showing the operation of a power control section.
Figure 14:
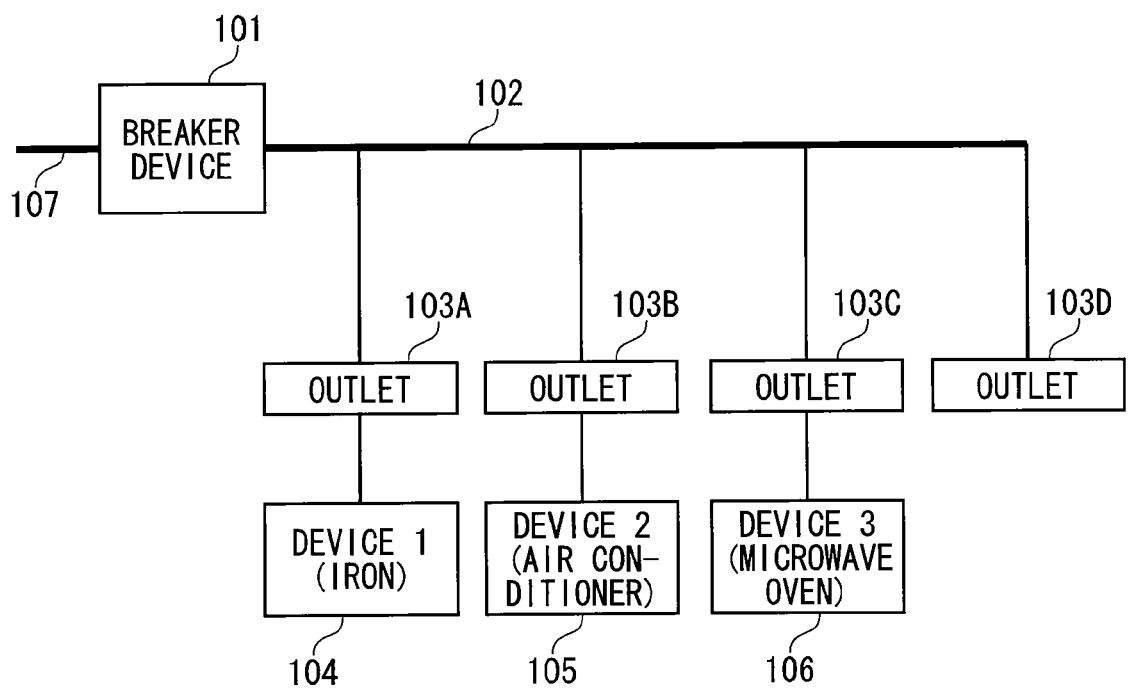
FIG. 14 is a view showing the configuration of a conventional power control system.

Next, the entire operation of the power control section 80 will be described as an example using a flow chart in FIG. 13. In FIG. 13, electric power of the first home appliance 61 is set to Pw1, electric power of the second home appliance 70 is set to Pw2, and electric power of the third home appliance 71 is set to Pw3. In addition, as shown in FIG. 9, required power of the first home appliance 61 is set to P5, and the threshold value of the current limiter 81 is set to P1. In addition, the total power P is the sum of electric power of the first to third home appliances 61, 70, and 71.

First, it is checked whether or not the first home appliance 61 is operating. If the first home appliance 61 is not operating, the second and third home appliances 70 and 71 are normally used, that is, the second and third home appliances 70 and 71 are normally operated without reducing the electric power Pw1 and Pw2 (steps 50 and 51).

If the first home appliance 61 is operated by the operating section 84, the required power storage section 85 of the first home appliance 61 transmits the required power P5 to the power control section 80 using the communication section (step 52). Then, it is determined whether or not whether expected power P5+Pw1+Pw2, which is obtained by adding the required power P5, is larger than the threshold value P1 (step 53). If the expected power P5+Pw1+Pw2 is smaller than the threshold value P1, it is determined that power shutdown caused by the current limiter 81 does not occur, and each device is normally used without reducing the electric power (step 54).

If the expected power P5+Pw1+Pw2 is larger than the threshold value P1, it is determined that it is necessary to reduce the total electric power, and the device information regarding each home appliance is acquired (step 55). The electric power Pw2 of the second home appliance 70 and the electric power Pw3 of the third home appliance 71 are reduced according to the device information (step 56). In addition, the electric power Pw1 of the first home appliance 61 is determined temporarily according to the device information (step 57). P1−Pw2−Pw3 which is the current margin power of the current limiter 81 is compared with the temporarily determined electric power Pw1 of the first home appliance 61 (step 58). If the electric power Pw1 is larger than the margin power, the electric power Pw1 is changed to the margin power P1−Pw2−Pw3 (step 59). Then, control is made such that the first home appliance 61 operates with the determined electric power Pw1 (step 60).

Then, it is determined whether or not the first home appliance 61 has been turned off (step 61). Steps S54 to 61 are repeated if the first home appliance 61 is not OFF, and the process return to step 51 if the first home appliance 61 is OFF (step 51).

The above-described flow chart shown in FIG. 13 is an example. In short, it is preferable to control electric power according to the priority.

According to an invention of the second embodiment, there is provided a power control system including a plurality of home appliances connected to each other by cable or wirelessly through a communication network section and a power control device. Each of the home appliances includes: a power detecting section which measures or checks power consumption of the home appliance and outputs the power consumption as a power information signal; and a home appliance control section which controls the home appliance on the basis of a power control signal acquired from a home appliance information communication section and a power signal from the power detecting section. The home appliance information communication section performs communication of a power information signal, a power control signal, or home appliance operation information with the power control system and other home appliances through the communication network section. The power control device includes: a current detecting section which detects a current of one or more electrical systems of the commercial power supply; a voltage detecting section which detects a voltage of the commercial power supply; a power calculating section which calculates electric power from the detection information of the current detecting section and the voltage detecting section; a power control communication section which performs communication with the home appliance; a current upper limit setting section which sets an upper limit of a current flowing through the current detecting section; a power upper limit setting section which sets an upper limit of the electric power calculated by the power calculating section; a priority setting section which sets the use priority of the home appliance; and a power control section to which the current upper limit from the current upper limit setting section, the power upper limit from the power upper limit setting section, the priority from the priority setting section, and the communication information of the home appliance from the power control communication section are input and which determines the electric power value of the home appliance as a power control signal and outputs the power control signal to the power control communication section. When a first home appliance which is one of a plurality of home appliances is operated, an inquiry including the operation information is transmitted to the power control device, and a power control section of the power control device outputs a power control signal for reducing a current or electric power to a home appliance, which has a lower priority set by the priority setting section than the first home appliance, when reducing a current or electric power is necessary in order to enable the first home appliance to be used.

According to the configuration and the operation of the invention of the second embodiment, the power control section of the power control device controls electric power of a device autonomously. Therefore, since a user does not need to control electric power with his or her hands, the user can save time and effort. In addition, since electric power of a device is controlled according to the priority, a device with a high priority for the user can be used without inconvenience.

Moreover, according to the invention of the second embodiment, when the operation on the first home appliance is a transition to a mode in which electric power of a device does not increase, an inquiry is not transmitted to the power control device. Accordingly, when electric power of a device does not increase, communication is not performed since it is not necessary to adjust the total electric power. As a result, since it is possible to save useless time taken for communication, control, and the like, more real-time control can be performed.

Moreover, according to the invention of the second embodiment, the power control section of the power control device stops transmission of the power control signal to the first home appliance until a drop in electric power by control of a home appliance with a lower priority is confirmed, and the first home appliance does not operate until the power control signal from the power control section of the power control device is input. Even if the power control signal is received, it takes time until electric power is actually reduced, in many cases, in order to ensure the quality and long life. Therefore, since electric power of the first home appliance is increased after checking that electric power has actually been decreased, the home appliance with higher reliability can be provided.

Moreover, according to the invention of the second embodiment, the power control section reduces electric power gradually by a power control signal of a home appliance with a low priority. Accordingly, since electric power is gradually reduced, it is possible to suppress a decrease in user convenience caused by significant power reduction to some extent.

In addition, a time for user action, such as location movement or menu change, can be given by controlling electric power gradually over time.

Moreover, according to the invention of the second embodiment, the power control section of the power control device changes a time variation when reducing electric power of a home appliance with a low priority gradually according to the kind of target home appliances. Therefore, since a time for which electric power is gradually reduced is changed according to the target home appliances, it is possible to reduce electric power while ensuring the quality of a device with a low priority and increasing the life of the device.

Moreover, according to the invention of the second embodiment, the power control section increases electric power gradually by the power control signal of the first home appliance. Therefore, since it is possible to realize a home appliance with better rising of electric power, the home appliance with higher user convenience can be provided.

Moreover, according to the invention of the second embodiment, the power control section changes a time variation when increasing electric power of the first home appliance gradually according to the kind of the first home appliance. Therefore, since the rising of electric power changes according to the kind of the first home appliance, it is possible to provide the home appliance with better convenience while ensuring the quality.

Moreover, according to the invention of the second embodiment, when electric power at the time of operation of the first home appliance cannot be secured even if electric power is reduced by control of a home appliance with a low priority, the power control section outputs electric power not exceeding the power upper limit as maximum power, and the first home appliance operates with the electric power less than the maximum power indicated by the power control signal from the power control section of the power control device. Therefore, even in the case where the first home appliance operates, cutoff by a current limiter does not occur since the power upper limit is not exceeded. As a result, it is possible to provide a home appliance with better convenience.

While the present invention has been described in detail with reference to the specific embodiments, it is apparent to those skilled in the art that various changes and modifications may be made without departing from the spirit and scope of the present invention.

The present invention is based on Japanese Patent Application (Patent Application No. 2009-000508) filed on Jan. 6, 2009 and Japanese Patent Application (Patent Application No. 2009-001292) filed on Jan. 7, 2009, the entire content of which is incorporated herein by reference.

INDUSTRIAL APPLICABILITY

As described above, the power control system, the control method of the power control system, and the program according to the present invention may also be applied to a small-scale system at home or a large-scale system outside the home in the same method. Also from the point of view of energy saving, the same method may be applied in order to set the current upper limit.

The invention claimed is:
1. A power control system comprising:
an induction heating (IH) cooker heater connected wirelessly or via cable through a communication network section; and
a power control device,
wherein the IH cooker heater comprises:
a power detecting section configured to measure or obtain power consumption of the IH cooker heater,
wherein the power control device comprises:
a current detecting section configured to detect a current flowing through one or more electrical systems of a commercial power supply;
a voltage detecting section configured to detect a voltage of the commercial power supply;
a power calculating section configured to calculate electric power from detection information of the current detecting section and the voltage detecting section;
a transceiver section configured to communicate with the IH cooker heater;
an upper limit setting section configured to set an upper limit of a current flowing through the current detecting section;
a priority setting section configured to set a use priority of the IH cooker heater; and
a power control instructing section configured to output alarm notification or a power control instruction to the IH cooker heater when it is detected that the current flowing through the current detecting section is equal to or larger than a current value set by the upper limit setting section,
wherein during operation of the IH cooker heater, an inquiry about whether the IH cooker heater is usable is transmitted to the power control device, and an operation of the IH cooker heater is controlled according to an inquiry result, and wherein the power control device outputs a power control instruction to a device which has a lower priority set by the priority setting section than the

IH cooker heater which has transmitted the inquiry, based on a content of the inquiry and the detection information of the current detecting section; and during operation of transitioning the IH cooker heater to a mode of increased output power, an inquiry is transmitted to the power control device together with information including an amount of required power, wherein the amount of required power is added to a present state of power, and a current flow exceeds the upper limit set by the high limit setting section is expected to flow, the power control device tries to secure the required power by performing a control to reduce electric power of a device with a lower priority than the IH cooking heater to use the IH cooker heater at a maximum capability, and when the required power cannot be secured with control of the device with the lower priority than the IH cooking heater, a device output power deciding section of the IH cooking heater is configured to decide to operate the IH cooking heater in a mode within usable power of the inquiry result.

2. The power control system according to claim 1, wherein during an operation of transition transitioning the IH heater to a mode in which power consumption does not increase, the operation of the IH cooker heater is controlled according to an instruction of the operation without transmitting the inquiry about whether the IH cooker heater can be used to the power control device.

3. The power control system according to claim 1, wherein during operation of the IH cooker heater, a content of the inquiry about whether the IH cooker heater can be used transmitted to the power control device includes a required power value, and the inquiry result includes information containing a usable power value.

4. The power control system according to claim 1, wherein at least one device included in the power control system comprises a display section configured to display information including power consumption of the device collected in the power control system.

5. The power control system according to claim 1, wherein at least one device included in the power control system comprises a Web server, and wherein a device such as a personal computer or a television comprising a Web browser uses the Web browser as a display section to display information containing power consumption collected by the device comprising the Web server through a network.

6. A non-transitory computer readable medium storing a program causing a computer to perform operations of the power control system according to claim 1.

* * * * *